US009779331B2

(12) United States Patent
Bulan et al.

(10) Patent No.: US 9,779,331 B2
(45) Date of Patent: Oct. 3, 2017

(54) METHOD AND SYSTEM FOR PARTIAL OCCLUSION HANDLING IN VEHICLE TRACKING USING DEFORMABLE PARTS MODEL

(71) Applicant: Conduent Business Services, LLC, Dallas, TX (US)

(72) Inventors: Orhan Bulan, Henrietta, NY (US); Yusuf Oguzhan Artan, Demetevler/Ankara (TR); Aaron Michael Burry, Ontario, NY (US)

(73) Assignee: Conduent Business Services, LLC, Dallas, TX (US)

( * ) Notice: Subject to any disclaimer, the term of this patent is extended or adjusted under 35 U.S.C. 154(b) by 101 days.

(21) Appl. No.: 14/632,237

(22) Filed: Feb. 26, 2015

(65) Prior Publication Data
US 2015/0310624 A1 Oct. 29, 2015

Related U.S. Application Data

(60) Provisional application No. 61/984,327, filed on Apr. 25, 2014.

(51) Int. Cl.
*G06K 9/00* (2006.01)
*G06K 9/66* (2006.01)
(Continued)

(52) U.S. Cl.
CPC ............ *G06K 9/66* (2013.01); *G06K 9/00785* (2013.01); *G06T 7/215* (2017.01); *G06T 7/248* (2017.01);
(Continued)

(58) Field of Classification Search
CPC . G06T 2207/30236; G06T 2207/10016; G06T 7/2013; G06T 7/2066;
(Continued)

(56) References Cited

U.S. PATENT DOCUMENTS 5,465,115 A 11/1995 Conrad et al.
5,581,625 A 12/1996 Connell
(Continued)

OTHER PUBLICATIONS

U.S. Appl. No. 13/975,245, filed Aug. 23, 2013, Gross et al.
(Continued)

*Primary Examiner* — Utpal Shah
*Assistant Examiner* — Ian Lemieux
(74) *Attorney, Agent, or Firm* — Fay Sharpe LLP

(57) ABSTRACT

Provided is a method and system of tracking partially occluded objects using an elastic deformation model. According to an exemplary method and system, partially occluded vehicles are detected and tracked in a scene including side-by-side drive-thru lanes. A method for updating an event sequence includes acquiring video data of a queue area from at least one image source; searching the frames for subjects located at least near a region of interest (ROI) of defined start points in the video data; tracking a movement of each detected subject through the queue area over a subsequent series of frames; using the tracking, determining if a location of the a tracked subject reaches a predefined merge point where multiple queues in the queue area converge into a single queue lane; in response to the tracked subject reaching the predefined merge point, computing an observed sequence of where the tracked subject places among other subjects approaching an end-event point; and, updating a sequence of end-events to match the observed sequence of subjects in the single queue lane.

20 Claims, 13 Drawing Sheets

(51) Int. Cl.
G06T 7/215 (2017.01)
G06T 7/246 (2017.01)
G06T 7/254 (2017.01)
(52) U.S. Cl.
CPC .... *G06T 7/254* (2017.01); *G06T 2207/30232* (2013.01); *G06T 2207/30236* (2013.01)
(58) Field of Classification Search
CPC ...... G06T 2207/20081; G06K 9/00785; G06K 9/00771
See application file for complete search history.

(56) References Cited

U.S. PATENT DOCUMENTS

| | | | |
|---|---|---|---|
| 5,953,055 A | 9/1999 | Huang et al. | |
| 6,195,121 B1 | 2/2001 | Huang et al. | |
| 6,654,047 B2 | 11/2003 | Hzaka | |
| 7,688,349 B2 | 3/2010 | Flickner et al. | |
| 8,401,230 B2 | 3/2013 | Kozitsky et al. | |
| 2008/0075367 A1* | 3/2008 | Winn | G06K 9/342 382/180 |
| 2008/0107304 A1* | 5/2008 | Coulter | G06K 9/00369 382/103 |
| 2009/0141940 A1* | 6/2009 | Zhao | G06K 9/00295 382/103 |
| 2010/0322476 A1* | 12/2010 | Kanhere | G06T 7/0065 382/103 |
| 2012/0106781 A1* | 5/2012 | Kozitsky | G06Q 10/087 382/103 |
| 2012/0146789 A1* | 6/2012 | De Luca | G08B 21/12 340/540 |
| 2012/0219211 A1* | 8/2012 | Ding | G06K 9/4642 382/159 |
| 2013/0265419 A1 | 10/2013 | Bulan et al. | |
| 2014/0063256 A1 | 3/2014 | Mongeon et al. | |
| 2014/0063263 A1 | 3/2014 | Bernal et al. | |
| 2014/0064566 A1 | 3/2014 | Shreve et al. | |

OTHER PUBLICATIONS

U.S. Appl. No. 14/022,488, filed Sep. 10, 2013, Loce et al.
U.S. Appl. No. 14/260,915, filed Apr. 24, 2014, Burry.
U.S. Appl. No. 14/261,013, filed Apr. 24, 2014, Bernal.
Agent VI, "Video Analytics Applications for the Retail Market", created Jan. 23, 2012, http://www.agentvi.com/images/Agent_Vi_-_Retail_Applications.pdf.
Bay et al., "SURF: Speeded Up Robust Features", Computer Vision and Image Understanding, V. 110.3, 2008, p. 346-359.
Comaniciu et al., "Real-Time Tracking of Non-Rigid Objects Using Mean Shift", Proceedings of IEEE Conference on Computer Vision and Pattern Recognition, 2000, p. 142-149.
Dalal et al., "Histograms of Oriented Gradients for Human Detection", 2005.
Dickmanns et al., "Dynamic Monocular Machine Vision", Machine Vision and Applications, 1988, p. 223-240.
Forssen et al., "Shape Descriptors for Maximally Stable Extremal Regions", Proceedings of IEEE Conference on Computer Vision and Pattern Recognition, 2007.
Gustafsson et al., "Particle Filters for Positioning, Navigation and Tracking", IEEE Transactions on Signal Processing, 2002.
Harris et al., "A Combined Corner and Edge Detector", Alvey Vision Conference, vol. 15, 1988, p. 147-152.
Honeywell Security, "Intelligent Video Analytics for: The Retail Applications Market", Sep. 2007, http://www.security.honeywell.com/uk/video/documents/VideoAnalytics_Retail_UK.pdf.
Horn et al., "Determining Optical Flow", Artificial Intelligence 17, 1981, p. 185-203.
Huang et al., "Survey on Block Matching Motion Estimation Algorithms and Architectures With New Results", Journal of VLSI Signal Processing Systems 42, 2006, p. 297-320.
Kass et al., "Snakes: Active Contour Models", International Journal of Computer Vision, 1988, p. 321-331.
Ke et al., "PCA-SIFT: A More Distinctive Representation for Local Image Descriptors", Proceedings of IEEE Conference on Computer Vision and Pattern Recognition, 2004.
Lo et al., "Automatic Congestion Detection System for Underground Platforms", Proceedings of 2001 International Symposium on Intelligent Multimedia, Video and Speech Processing, May 2-4, 2001, p. 158-161.
Lowe, "Distinctive Image Features From Scale-Invariant Keypoints", 2004, p. 91-110.
Makarov, et al., "Intrusion Detection Using Extraction of Moving Edges", $12^{th}$ IAPR Int'l Conf. on Pattern Recognition, V.1, 1994, p. 804-807.
Oliver et al., "A Bayesian Computer Vision System for Modeling Human Interactions", IEEE Transactions on Pattern Analysis and Machine Intelligence, vol. 22, No. 8, Aug. 2000, p. 831-843.
Pillar, Real Value in Video Analytics, Integrated Solutions for Retailers, Jul. 26, 2010, http://www.retailsolutionsonline.com/doc/real-value-in-video-analytics-0001.
Retail Touch Points, "Video Analytics Solutions Help Retailers Optimize Customer Service and Workforce management", Dec. 9, 2011, http://www.retailtouchpoints.com/retail-store-ops/1230--video-analytics-solutions-help-retailers-optimize-customer-service-and-workforce-management-.
Rosten et al., "Machine Learning for High-Speed Corner Detection", Computer Vision ECCV 2006, p. 430-443.
Schmitt, "Checking in on "Minority Report" Video Analytics and Hyper-Targeting in Retail", Retail Touch Points, Feb. 3, 2011, http://www.retailtouchpoints.com/in-store-insights/714-checking-in-on-minority-report-video-analytics-and-hyper-targeting-in-retail.
Scopix Solutions, "Retail Video Analytics", http://www.scopixsolutions.com/solutions/.
Senior et al., "Video Analytics for Retail", 2007, http://rogerioferis.com/publications/FerisAVSS07b.pdf.
Stauffer et al., "Adaptive Background Mixture Models for Real-Time Tracking", Proceedings of the 1999 Conference on Computer vision and Pattern Recognition, 1999, p. 2246-2252.
Tomasi et al., "Detection and Tracking of Point Features", Technical Report CMU-CS-91-132, Carnegie Mellon University, School of Computer Science, 1991.
Zhu et al., "Face Detection, Pose Estimation, and Landmark Localization in the Wild", , Proceedings of IEEE Conference on Computer Vision and Pattern Recognition, 2012.

* cited by examiner

METHOD AND SYSTEM FOR PARTIAL OCCLUSION HANDLING IN VEHICLE TRACKING USING DEFORMABLE PARTS MODEL

CROSS REFERENCE TO RELATED PATENTS AND APPLICATIONS

This application claims priority to U.S. Provisional Application No. 61/984,327, filed on Apr. 25, 2014, by Bulan et al. and entitled "A METHOD AND SYSTEM FOR PARTIAL OCCLUSION HANDLING IN VEHICLE TRACKING USING DEFORMABLE PARTS MODEL", and U.S. application Ser. No. 14/260,915, filed on Apr. 24, 2014, by Burry et al., entitled "VIDEO TRACKING BASED METHOD FOR AUTOMATIC SEQUENCING OF VEHICLES IN DRIVE-THRU APPLICATIONS" and are incorporated herein by reference in their entirety.

BACKGROUND

Vehicle tracking through video analytics is associated with several transportation applications. These applications may include, but are not limited to, on-street parking occupancy detection, automated vehicle sequencing at merge point, short-term parking violation detection, and drive thru vehicle tracking, among others. A general challenge in all these applications is partial occlusions due to other vehicles in the scene. In some of these applications, when there is flexibility in the camera installation, the occlusion problem has been avoided or mitigated by optimizing camera geometry and configuration by, for example, installing the camera high enough or installing the camera to monitor along street instead of across street. In several others, however, the underlying infrastructure at the site poses limitations on the camera geometry and configuration and hence, does not allow optimizing camera configuration. In these settings, partial occlusions are still a challenge for robust and reliable vehicle tracking.

INCORPORATION BY REFERENCE

U.S. application Ser. No. 13/975,245, filed Aug. 23, 2013, by Gross et al. and entitled "SYSTEM AND METHOD FOR AUTOMATED SEQUENCING OF VEHICLE UNDER LOW SPEED CONDITIONS FROM VIDEO";

U.S. application Ser. No. 14/022,488, filed Sep. 9, 2013, by Loce et al. and entitled "DETERMINING SOURCE LANE OF MOVING ITEM MERGING INTO DESTINATION LANE";

U.S. application Ser. No. 14/260,915, filed Apr. 24, 2014, by Burry et al. and entitled "VIDEO TRACKING BASED METHOD FOR AUTOMATIC SEQUENCING OF VEHICLES IN DRIVE-THRU APPLICATIONS";

U.S. application Ser. No. 14/261,013, filed Apr. 24, 2014, by Bernal et al. and entitled "SYSTEM AND METHOD FOR VIDEO-BASED DETERMINATION OF QUEUE CONFIGURATION PARAMETERS";

U.S. Pat. No. 5,465,115, granted Nov. 7, 1995, to Conrad et al. and entitled "VIDEO TRAFFIC MONITOR FOR RETAIL ESTABLISHMENTS AND THE LIKE";

U.S. Pat. No. 5,581,625, granted Dec. 3, 1996, to Connell and entitled "STEREO VISION SYSTEM FOR COUNTING ITEMS IN A QUEUE";

U.S. Pat. No. 5,953,055, granted Jun. 14, 1999, to Huang et al. and entitled "SYSTEM AND METHOD FOR DETECTING AND ANALYZING A QUEUE";

U.S. Pat. No. 6,195,121, granted Feb. 27, 2001, to Huang et al. and entitled "SYSTEM AND METHOD FOR DETECTING AN ANALYZING A QUEUE";

U.S. Pat. No. 6,654,047, granted on Nov. 25, 2003, to Hzaka and entitled "METHOD OF AN DEVICE FOR ACQUIRING INFORMATION ON A TRAFFIC LINE OF PERSONS";

U.S. Pat. No. 7,688,349, granted on Mar. 30, 2010, to Flickner et al. and entitled "METHOD OF DETECTING AND TRACKING GROUPS OF PEOPLE";

U.S. Pat. No. 8,401,230, granted on Mar. 19, 2013, to Kozitsky et al. and entitled "SIGNATURE BASED DRIVE-THROUGH ORDER TRACKING SYSTEM AND METHOD";

U.S. Patent Publication No. 2013-0265419A1, published on Oct. 10, 2013, to Bulan et al. and entitled "SYSTEM AND METHOD FOR AVAILABLE PARKING SPACE ESTIMATION FOR MULTISPACE ON-STREET PARKING";

U.S. Patent Publication No. 2014-0063256A1, published on Mar. 6, 2014, to Mongeon et al. and entitled "QUEUE GROUP LEADER IDENTIFICATION";

U.S. Patent Publication No. 2014-0063263A1, published on Mar. 6, 2014, to Bernal et al. and entitled "SYSTEM AND METHOD FOR OBJECT TRACKING AND TIMING ACROSS MULTIPLE CAMERA VIEWS";

U.S. Patent Publication No. 2014-0064566A1, published on Jun. 6, 2014, to Shreve et al. and entitled "HEURISTIC-BASED APPROACH FOR AUTOMATIC PAYMENT GESTURE CLASSIFICATION AND DETECTION";

Agent V I, "Video Analytics Applications for the Retail Market", created Jan. 23, 2012, http://www.agentvi.com/images/Agent_Vi_-_Retail_Applications.pdf;

Bay et al., "SURF: Speeded Up Robust Features", Computer Vision and Image Understanding, V. 110.3, 2008, p 346-359;

Comaniciu et al., "Real-Time Tracking of Non-Rigid Objects Using Mean Shift", Proceedings of IEEE Conference on Computer Vision and Pattern Recognition, 2000, p 142-149;

Dalai et al., "Histograms of Oriented Gradients for Human Detection", 2005.

Dickmanns et al., "Dynamic Monocular Machine Vision", Machine Vision and Applications, 1988, p 223-240;

Forssen et al., "Shape Descriptors for Maximally Stable Extremal Regions", Proceedings of IEEE Conference on Computer Vision and Pattern Recognition, 2007;

Gustafsson et al., "Particle Filters for Positioning, Navigation and Tracking", IEEE Transactions on Signal Processing, 2002;

Harris et al., "A Combined Corner and Edge Detector", Alvey Vision Conference, Vol. 15, 1988, p 147-152;

Honeywell Security, "Intelligent Video Analytics for: The Retail Applications Market", September 2007, http://www.security.honeywell.com/uk/video/documents/VideoAnalytics_Retail_UK.pdf;

Horn et al., "Determining Optical Flow", Artificial Intelligence 17, 1981, p 185-203;

Huang et al., "Survey on Block Matching Motion Estimation Algorithms and Architectures With New Results", Journal of VLSI Signal Processing Systems 42, 2006, p 297-320;

Kass et al., "Snakes: Active Contour Models", International Journal of Computer Vision, 1988, p 321-331;

Ke et al., "PCA-SIFT: A More Distinctive Representation for Local Image Descriptors", Proceedings of IEEE Conference on Computer Vision and Pattern Recognition, 2004;

Lo et al., "Automatic Congestion Detection System for Underground Platforms", Proceedings of 2001 International Symposium on Intelligent Multimedia, Video and Speech Processing, May 2-4, 2001, p 158-161;

Lowe, "Distinctive Image Features From Scale-Invariant Keypoints", 2004, p 91-110;

Makarov, et al., "Intrusion Detection Using Extraction of Moving Edges", 12th IAPR Int'l Conf. on Pattern Recognition, V. 1, 1994, p 804-807;

Oliver et al., "A Bayesian Computer Vision System For Modeling Human Interactions", IEEE Transactions on Pattern Analysis and Machine Intelligence, Vol. 22, No. 8, August 2000, p 831-843;

Pillar, Real Value in Video Analytics, Integrated Solutions for Retailers, Jul. 26, 2010, http://www.retailsolutionsonline.com/doc/real-value-in-video-analytics-0001;

Retail Touch Points, "Video Analytics Solutions Help Retailers Optimize Customer Service and Workforce management", Dec. 9, 2011, http://www.retailtouchpoints.com/retail-store-ops/1230--video-analytics-solutions-help-retailers-optimize-customer-service-and-workforce-management-;

Rosten et al., "Machine Learning for High-Speed Corner Detection", Computer Vision ECCV 2006, p 430-443;

Schmitt, "Checking In On "Minority Report" Video Analytics and Hyper-Targeting in Retail", Retail Touch Points, Feb. 3, 2011, http://www.retailtouchpoints.com/in-store-insights/714-checking-in-on-minority-report-video-analytics-and-hyper-targeting-in-retail;

Scopix Solutions, "Retail Video Analytics", http://www.scopixsolutions.com/solutions/;

Senior et al., "Video Analytics for Retail", 2007, http://rogerioferis.com/publications/FerisAVSS07b.pdf;

Stauffer et al., "Adaptive Background Mixture Models for Real-Time Tracking", Proceedings of the 1999 Conference on Computer vision and Pattern Recognition, 1999, p 2246-2252;

Tomasi et al., "Detection and Tracking of Point Features", Technical Report CMU-CS-91-132, Carnegie Mellon University, School of Computer Science, 1991; and Zhu et al., "Face Detection, Pose Estimation, and Landmark Localization in the Wild", Proceedings of IEEE Conference on Computer Vision and Pattern Recognition, 2012, are incorporated herein by reference in their entirety.

BRIEF DESCRIPTION

In one embodiment of this disclosure, described is a computer implemented method of tracking a partially occluded object in a scene captured with an image capturing device, the method comprising: a) continuously monitoring an area of interest via an image capturing device; b) identifying candidate frames captured with the image capturing device, one or more of the candidate frames including a vehicle within one or more defined ROIs (Region of Interest); c) detecting a non-occluded portion of the vehicle in one or more of the candidate frames using one or more classifiers trained using extracted features from non-occluded portions of a set of training samples; and d) tracking the non-occluded portion of the vehicle across a plurality of video frames.

In another embodiment, described is an image processing system comprising: a memory and a processor operatively associated with the memory configured to receive a digital image of a scene and execute instructions to perform a method of tracking a partially occluded object in a scene captured with an image capturing device, the method comprising: a) continuously monitoring an area of interest via an image capturing device; b) identifying candidate frames captured with the image capturing device, one or more of the candidate frames potentially including a vehicle within one or more defined ROIs (Region of Interest); c) detecting a non-occluded portion of the vehicle in one or more of the candidate frames using one or more classifiers trained using extracted features from non-occluded portions of a set of training samples; and d) tracking the non-occluded portion of the vehicle across a plurality of video frames.

In still another embodiment of this disclosure, described is a system for updating an event sequence, the system comprising an automatic sequencing device including a memory and a processor in communication with the processor configured to: acquire video data of a queue area from at least one image source, each image source associated with an image plane; receive a number of individual event requests from multiple subjects, each event request being received when a subject is located in one of multiple queues in the queue area; process the video data using an elastic deformation model to detect a subject located near at least one of a plurality of start points, each start point corresponding to a location associated with one of the multiple queues in the video data; track a movement of each detected subject through the queue area over a subsequent series of frames; determine if a location of a tracked subject reaches a predefined merge point on the image plane where the multiple queues in the queue area converge into a single queue lane; in response to the tracked subject reaching the predefined merge point, compute an observed sequence of where the tracked subject places relative to other subjects already past the merge point and approaching an end-event point in the single queue lane; and, update a sequence of the events to match the observed sequence of subjects in the single queue lane.

DETAILED DESCRIPTION

Figure 1:
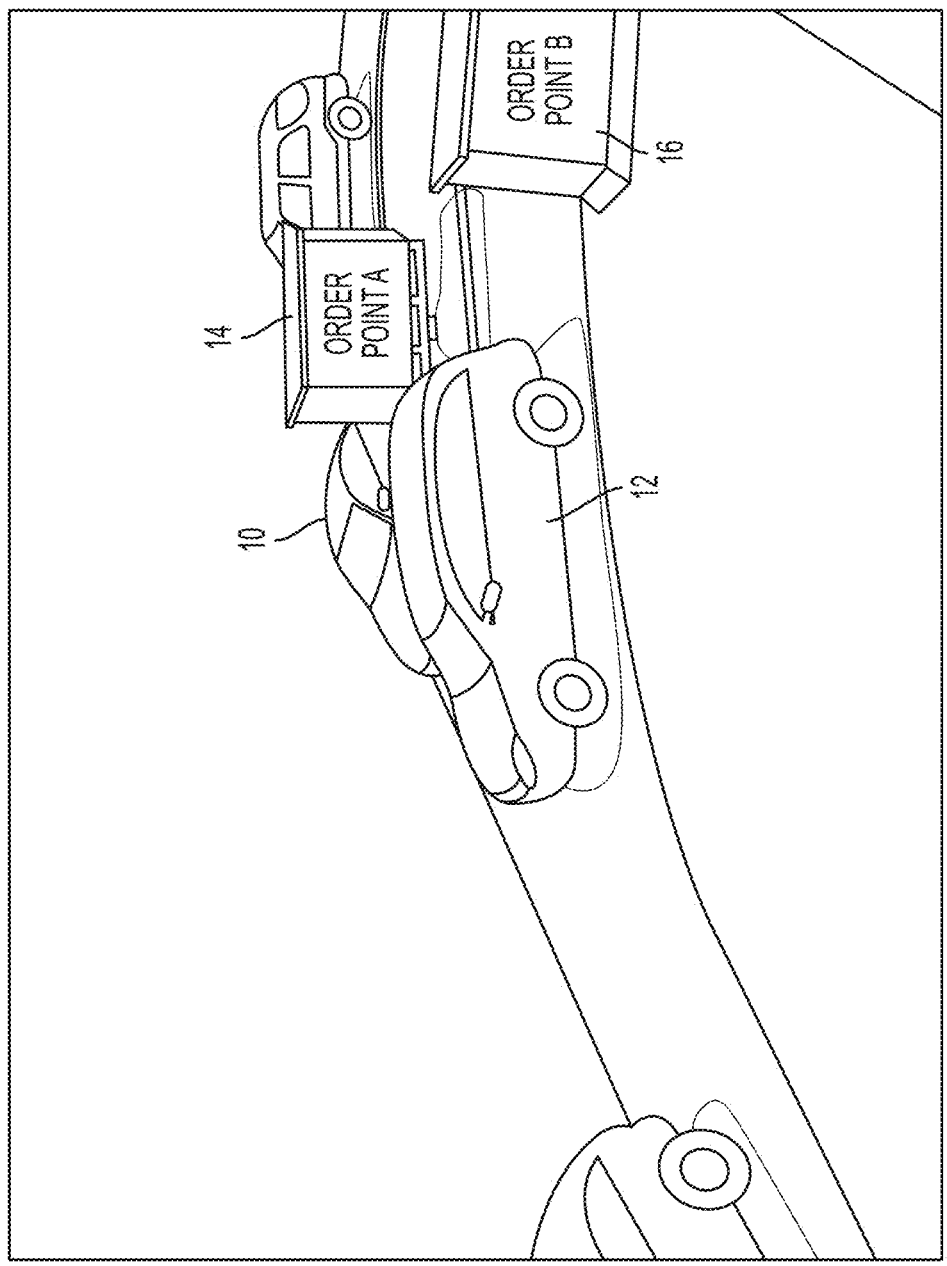
FIG. 1 and FIG. 2 illustrate examples of vehicle-to-vehicle occlusions associated with a side-by-side drive-thru lane.

This disclosure provides methods and systems to mitigate the impact of partial occlusions for vehicle tracking. The method and system begins tracking a vehicle's non-occluded portions, e.g., upper portion of a vehicle is typically not occluded by other vehicles in a scene and a vehicle tracking process can begin after an upper portion of a vehicle is detected in a region of interest, instead of beginning the vehicle tracker for a random portion of a vehicle using motion/foreground blob characteristics. The vehicle tracker then tracks the detected portion of the vehicle across a sequence of video frames as the vehicle travels. Detection of specific parts of a vehicle can be accomplished by using an elastic deformation model. See X. Zhu, D. Ramanan, "Face Detection, Pose Estimation, and Landmark Localization in the Wild", 2012 CVPR. The elastic deformation model requires an offline phase for training. During the offline training phase, according to an exemplary embodiment, 14 distinct landmarks are located at a non-occluded portion of the vehicles to be detected. The deformation model is trained using the located landmarks for a set of training images. During the operational phase, a candidate frame is first detected based on the motion/foreground blob characteristics within the region of interest (ROI). After a candidate frame is identified, indicating the existence of a vehicle within the ROI, vehicle non-occluded portions are detected using the trained deformation model developed during the offline phase. A vehicle tracker is then initialized to track the detected portion of the vehicle and the vehicle tracker continues to track the vehicle until it moves out of the FOV of the camera.

This disclosure and the exemplary embodiments described herein apply video analytics including a vehicle tracking method and system which accommodate partial occlusions of one or more tracked vehicles. Specifically, the exemplary embodiment described herein is associated with a side-by-side vehicle drive-thru, typically provided by some restaurants for customer order and pick-up, where a customer orders food, pays for ordered food and picks-up ordered food while remaining in a driven vehicle. While the exemplary embodiment described relates to a drive-thru, it is to be understood the disclosed video analytics providing partial occlusion object racking is not limited to other transportation applications, such as those discussed in the background.

Due to its increased customer throughput, relative to traditional configurations, a side-by-side drive-thru configuration has become a standard configuration to which newly built restaurants adhere, as well as the configuration to which many existing restaurants are migrating. While the side-by-side drive-thru configuration has benefits regarding the maximum drive-thru customer per hour rate that a restaurant can achieve, by reducing the number of "drive-off" occurrences in which a customer arrives, concludes that a line is too long or has to wait longer than planned, and so decides to leave, the side-by-side drive-thru configuration presents new challenges to restaurant managers. One such challenge is the determination of a correct customer order sequence, as vehicles can become shuffled between the time an order is placed by a drive-thru customer and the time the customer receives the order, due to the parallel nature of the side-by-side configuration. See U.S. Pat. No. 8,401,230, granted on Mar. 19, 2013, to Kozitsky et al. and entitled "SIGNATURE BASED DRIVE-THROUGH ORDER TRACKING SYSTEM AND METHOD", U.S. application Ser. No. 13/975,245, filed Aug. 23, 2013, by Gross et al. and entitled "SYSTEM AND METHOD FOR AUTOMATED SEQUENCING OF VEHICLE UNDER LOW SPEED CONDITIONS FROM VIDEO", and U.S. application Ser. No. 14/022,488, filed Sep. 9, 2013, by Loce et al. and entitled "DETERMINING SOURCE LANE OF MOVING ITEM MERGING INTO DESTINATION LANE". Since the line starts as a single lane that splits into two separate lanes with ordering consoles, and then the two lanes merge again into a single lane for payment and pickup, the two separate ordering points and re-merging of the lanes can cause a mismatch between the sequence in which the orders were taken and the sequence of cars that arrive at the pay and pickup counters. This "out of sequencing" can result in an incorrect price charged to the customer and/or the delivery of the incorrect food to the customer, contributing significantly to customer dissatisfaction. Even if the accuracy of the delivered orders is maintained, these out of sequence events result in significant time loss, i.e., inefficiency, as the employees re-sequence the orders to match the vehicles in the queue.

Figure 2:
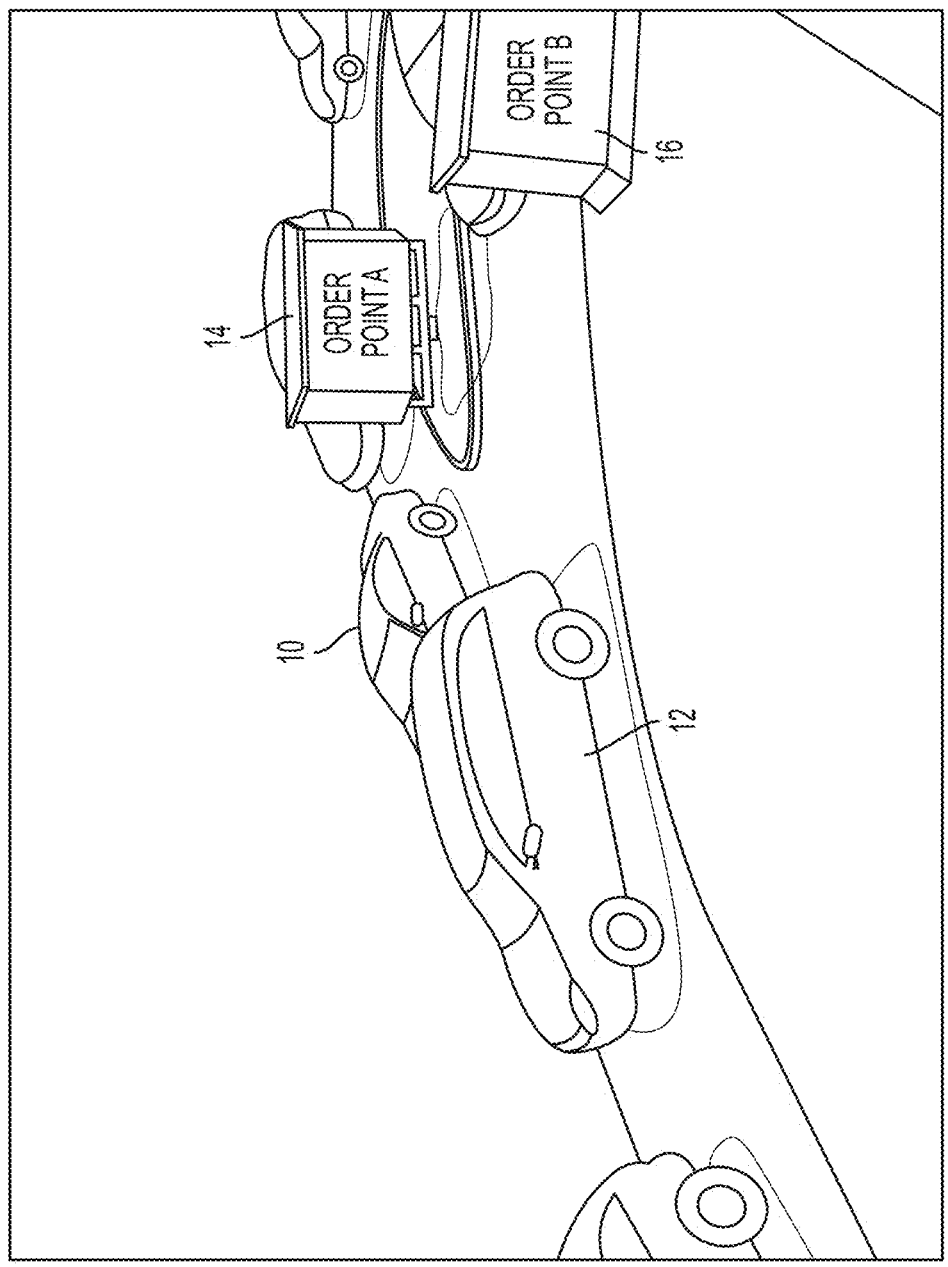

An automated method for accurately determining a post-merge sequence using a video camera to identify vehicles at each order point and track the identified vehicles through the merge point requires accurate and reliable tracking to maintain overall merge sequencing accuracy. Depending on the viewing angle of the video camera relative to the merge point area, accurately tracking vehicles may be difficult due to vehicle in one lane (usually the lane nearer to the camera) partially occluding vehicles in the other lane (usually the lane further from the camera) as illustrated in FIG. 1 and FIG. 2, where vehicle 12 partially occludes vehicle 10.

Other patent related disclosures related to automated merge-point order determination include the following.

U.S. Pat. No. 8,401,230, granted on Mar. 19, 2013, to Kozitsky et al. and entitled "SIGNATURE BASED DRIVE-THROUGH ORDER TRACKING SYSTEM AND METHOD".

U.S. application Ser. No. 13/975,245, filed Aug. 23, 2013, by Gross et al. and entitled "SYSTEM AND METHOD FOR AUTOMATED SEQUENCING OF VEHICLE UNDER LOW SPEED CONDITIONS FROM VIDEO".

U.S. application Ser. No. 14/022,488, filed Sep. 9, 2013, by Loce et al. and entitled "DETERMINING SOURCE LANE OF MOVING ITEM MERGING INTO DESTINATION LANE".

This disclosure describes a method and system for mitigating the impact of partial occlusions in vehicle tracking. The method handles partial occlusions by initializing a vehicle tracker detecting a specific portion of a vehicle, e.g., upper portion of a vehicle typically not occluded by other vehicles in the scene, in ROI (Region of Interest associated with an image frame/scene). The vehicle tracker then tracks the detected portion of the vehicle across multiple frames. The vehicle tracker performs detection of specific parts of a vehicle by using one or more methods by extracting a set of features (e.g., SIFT, SURF, HOG, SMQT, etc.) and training one or more classifiers (e.g., SVM, SNOW, NEURAL NETWORKS, etc.), one method including using an elastic deformation model initially proposed for face detection by X. Zhu, D. Ramanan, "Face Detection, Pose Estimation, and Landmark Localization in the Wild", 2012 CVPR. The elastic deformation model requires an offline phase for training. During the offline phase, 14 distinct landmarks are located at a specific portion of the vehicles desired to be detected and the deformation model is developed using the located landmarks on a set of training images. During the operational phase, a candidate frame is first detected based on motion/foreground blob characteristics within the ROI associated with the scene. After a candidate frame is identified, indicating the existence of a vehicle within the ROI, vehicle portions are detected using the elastic deformation model developed during the offline phase. A vehicle tracker is then initialized to track the vehicle until it moves out of the FOV of the camera directed at the scene.

The exemplary method includes the following steps:
1) Continuously monitoring an area of interest via a video camera;
2) Defining region of interest within the FOV of the camera (optional);
3) Identifying candidate frames in which a vehicle may exist within the defined ROIs;
4) Detecting parts of a vehicle in the identified candidate frames;
5) Checking if the detected vehicle part is already being tracked;
6) Initializing a tracker to track the non-occluded portion of the vehicle and continue to track the vehicle across multiple video frames;

Background on Deformable Parts Model(s)

In X. Zhu, D. Ramanan, "Face Detection, Pose Estimation, and Landmark Localization in the Wild", 2012 CVPR, Zhu and Ramanan developed a face detection model that has a simple approach to encode the elastic deformation and 3D structure of an object for face detection and pose estimation. It uses mixtures of trees (poses) with a shared pool of parts defined at each landmark positions. It then uses global mixtures to model topological changes due to view points. The paper shows that the global mixture can also be used to capture gross deformation changes for a single viewpoint. X. Zhu, D. Ramanan, "Face Detection, Pose Estimation, and Landmark Localization in the Wild", 2012 CVPR evaluates each particular configuration of parts $L=\{l_i: i \in V\}$ for a given image I by a score function as shown in Eq. (1) below.

$$S(I, L, m) = \text{App}_m(I, L) + \text{Shape}_m(L) + \alpha^m, \quad (1)$$

$$\text{App}_m(I, L) = \sum_{i \in V_m} w_i^m \cdot \phi(I, l_i)$$

$$\text{Shape}_m(L) = \sum_{ij \in E_m} a_{ij}^m dx^2 + b_{ij}^m dx + c_{ij}^m dy^2 + d_{ij}^m dy$$

where S is a score as a function of the image being analyzed I, the one or more landmark points L tuned for a mixture m, $\phi(I,l_i)$ is the HoG (Histogram of Gradients) features extracted at location $l_i$, $\text{App}_m$ is a sum of appearance evidence for placing a template $w_i^m$ for a part tuned for the mixture m at a location $l_i$ of the image. $\text{Shape}_m$ is a score of a mixture specific spatial arrangement of parts L (dx and dy are the x-axis and y-axis displacements of part i with respect to part j, and parameters (a, b, c and d) specify the spatial cost constraints between pairs of parts i and j) or a geometric relationship between the one or more landmark points (e.g., a number of pixels between a corner of an eye to an eyelid) and $\alpha^m$ is a constant for the mixture m. $V_m$ represents a pool of parts belonging to the mixture m. $E_m$ represents a set of edges between the pool of parts in $V_m$.

During inference, Eq. (1) is maximized over L and m, $$S*(I) = \max_m \left[ \max_L S(I, L, m) \right]$$

In this disclosure, leveraging the model described in Zhu et al., "Face Detection, Pose Estimation, and Landmark Localization in the Wild", Proceedings of IEEE Conference on Computer Vision and Pattern Recognition, 2012, 14 landmarks are located on a set of training images to develop a vehicle parts model to be used during the operational phase. While the exemplary embodiment described includes 14 landmarks, it is to be understood more or less landmarks can be used, for example 2-13, or 15 or more.

Various aspects of the method and system are now described.

1) Continuous Monitoring the Area of Interest Via a Video Camera.

The video acquisition module comprises at least one video camera that captures video of the area of interest. No specific requirements in terms of spatial or temporal resolutions are needed. However, traditional surveillance cameras are typically IP cameras with pixel resolutions of VGA and above (640×480) and frame rates of 15 fps (frames per second) and above. According to one exemplary embodiment, the system can include a point and shoot RGB camera with a 320×240 pixel resolution and a frame rate of 30 fps.

2) Defining Region of Interest within the FOV of the Camera (Optional)

Figure 3:
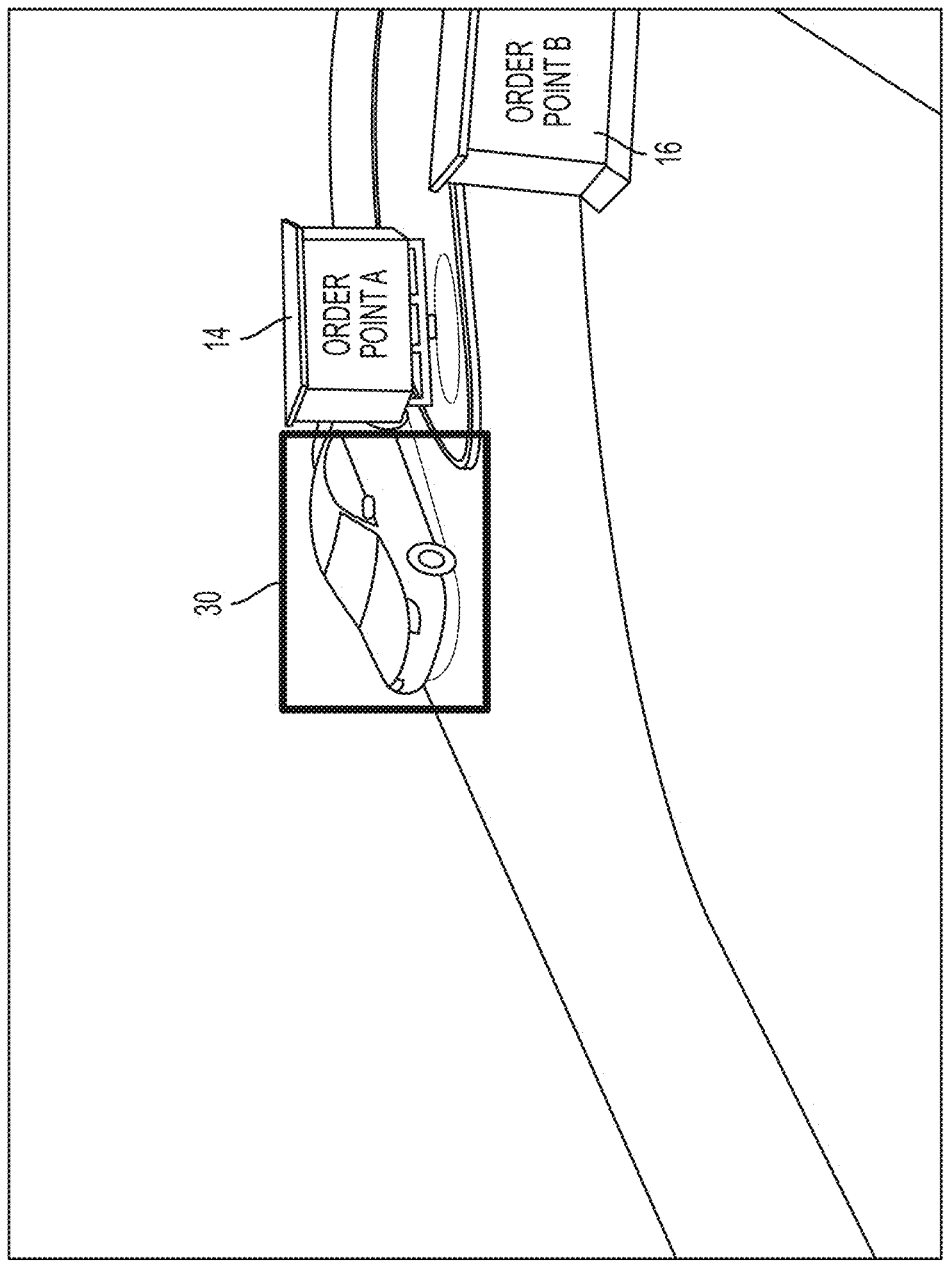
FIG. 3 illustrates a ROI (Region of Interest) defined for an order point A (away) for a side-by-side drive-thru lane, according to an exemplary embodiment of this disclosure.
Figure 4:
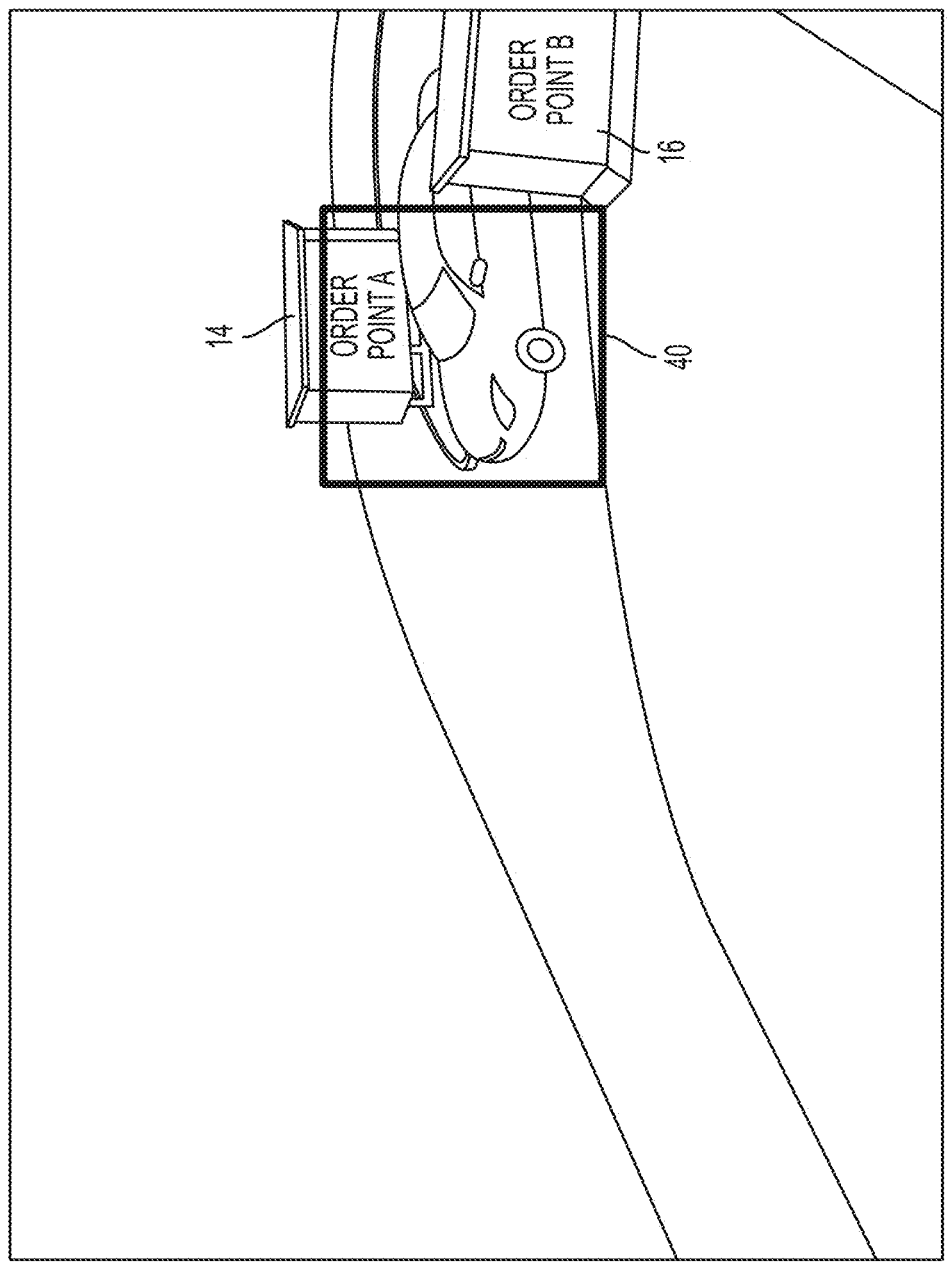
FIG. 4 illustrates a ROI defined for an order point B (near) for a side-by-side drive-thru lane, according to an exemplary embodiment of this disclosure.

Optionally, region of interests (ROIs) can be defined on an image plane. FIGS. 3 and 4, for example, illustrate two region of interests 30 and 40, respectively, defined for automated sequencing of vehicles in a side-by-side drive thru setting, as shown in FIGS. 1 and 2. Each of the ROIs corresponds to one of the order points in the scene. ROIs can be defined manually during the camera installation. Defining ROIs reduces the computational load of the video analytics algorithm since it reduces the search space for the vehicle parts detection process prior to initializing the tracker.

3) Detecting Candidate Frames in which a Vehicle May Exist within the Defined ROIs.

Performing vehicle parts searching within a region of interest in all the frames of a captured video is computationally expensive, especially if the resolution and the frame rate of the captured video is high. In order provide satisfy a real-time processing vehicle tracking system, the captured video is typically processed to identify candidate frames where a vehicle may exist in the defined ROIs. The vehicle parts detection process is only performed for candidate frames, thereby increasing the computational efficiency of the system and also the vehicle detection performance of the vehicle tracking system, i.e., detection accuracy. Detection accuracy is improved because performing vehicle parts detection only in candidate frames reduces the search space and hence, eliminates possible false detections from non-candidate frames. The candidate frames can be identified in several ways including, but not limited to, the following:

Using a background subtraction method when a static camera is being used to capture the video feed. A candidate frame is identified if a foreground object is detected within a region of interest. When an image of the background without any foreground objects is available, background removal computes the absolute intensity/color difference between the known background image and each image in the video sequence. Pixels for which the computed distance in the intensity/color space is small are classified as background pixels. There are several techniques for background estimation such as those based on Gaussian mixture models, see C. Stauffer and W. E. L. Crimson. "Adaptive background mixture models for real-time tracking", In Proc. of the 1999 Conference on Computer Vision and Pattern Recognition (CVPR '99), pages 2246-2252, 1999, eigenbackgrounds which use principal component analysis, see Oliver, N. M.; Rosario, B.; Pentland, A. P., "A Bayesian Computer Vision System For Modeling Human Interactions", IEEE Transactions on PAMI, pages 831-843, or computation of running averages, see B. P. L. Lo and S. A. Velastin, "Automatic congestion detection system for underground platforms," Proc. of 2001 Int. Symp. on Intell. Multimedia, Video and Speech Processing, pp. 158-161, that gradually update the background as new frames come.

Using motion detection methods within a region of interest defined on the image plane. Temporal difference methods, for example, subtract subsequent video frames followed by thresholding to detect regions of change, see U.S. Patent Publication No. 2013-0265419A1, published on Oct. 10, 2013, to Bulan et al. and entitled "SYSTEM AND METHOD FOR AVAILABLE PARKING SPACE ESTIMATION FOR MULTISPACE ON-STREET PARKING" and MAKAROV, et al., "Intrusion Detection Using Extraction of Moving Edges", 12th IAPR Intl Conf. on Pattern Recognition, V. 1, 1994, p 804-807. Motion regions in a video sequence can also be extracted using a pixel-level optical flow method, see "Determining Optical Flow," B. K. P. Horn and B. G. Schunck, Artificial Intelligence 17 (1981), 185-203, or using a block-matching algorithm, see HUANG et al., "Survey on Block Matching Motion Estimation Algorithms and Architectures With New Results", Journal of VLSI Signal Processing Systems 42, 2006, p 297-320.

A candidate frame is then identified when a foreground/motion blob is detected within the ROIs defined on the image plane. These candidate frames are then further analyzed in the next steps to identify specific parts of a detected vehicle.

4) Detecting Parts of a Vehicle in Candidate Frames.

Figure 5:
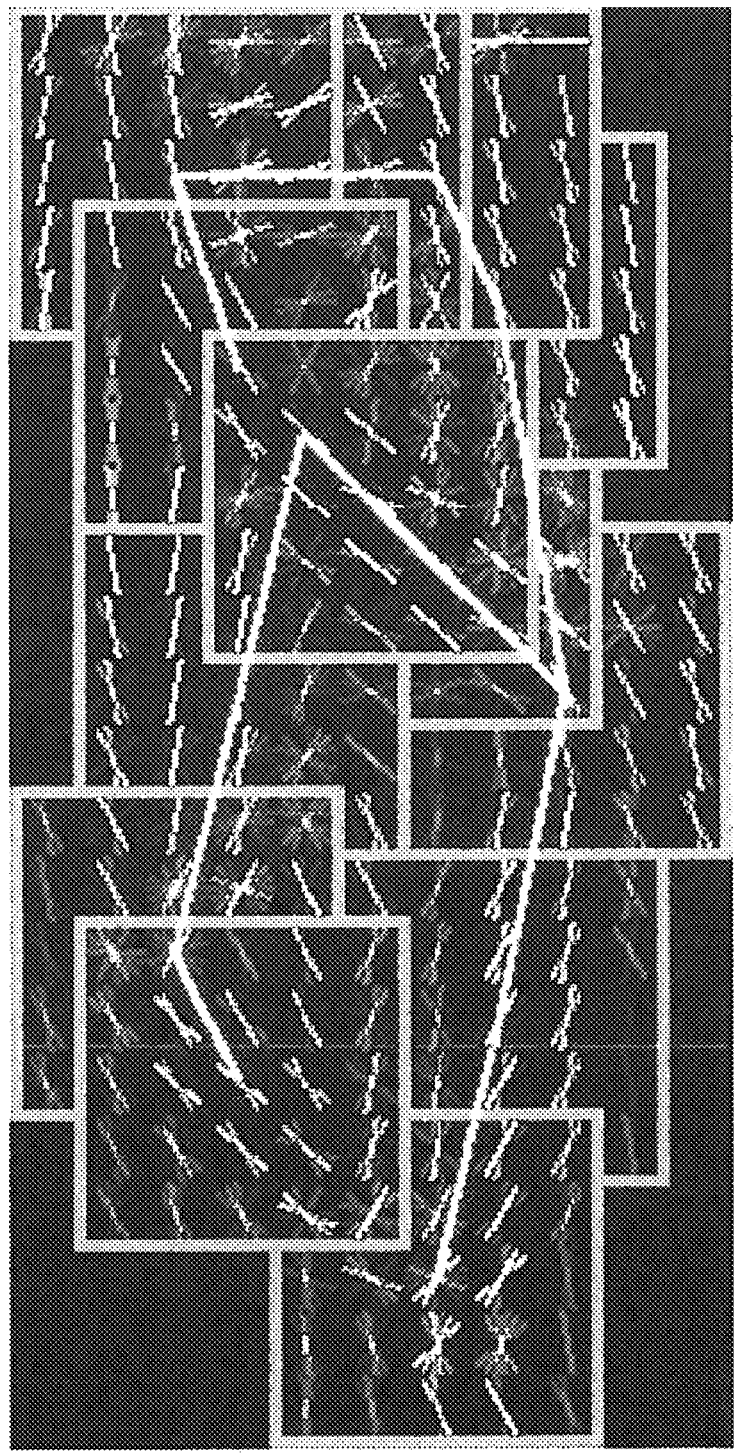
FIG. 5 illustrates vehicle upper portion and vehicle side view models for vehicles traversing ROIs defined for order point A, according to an exemplary embodiment of this disclosure.
Figure 6:
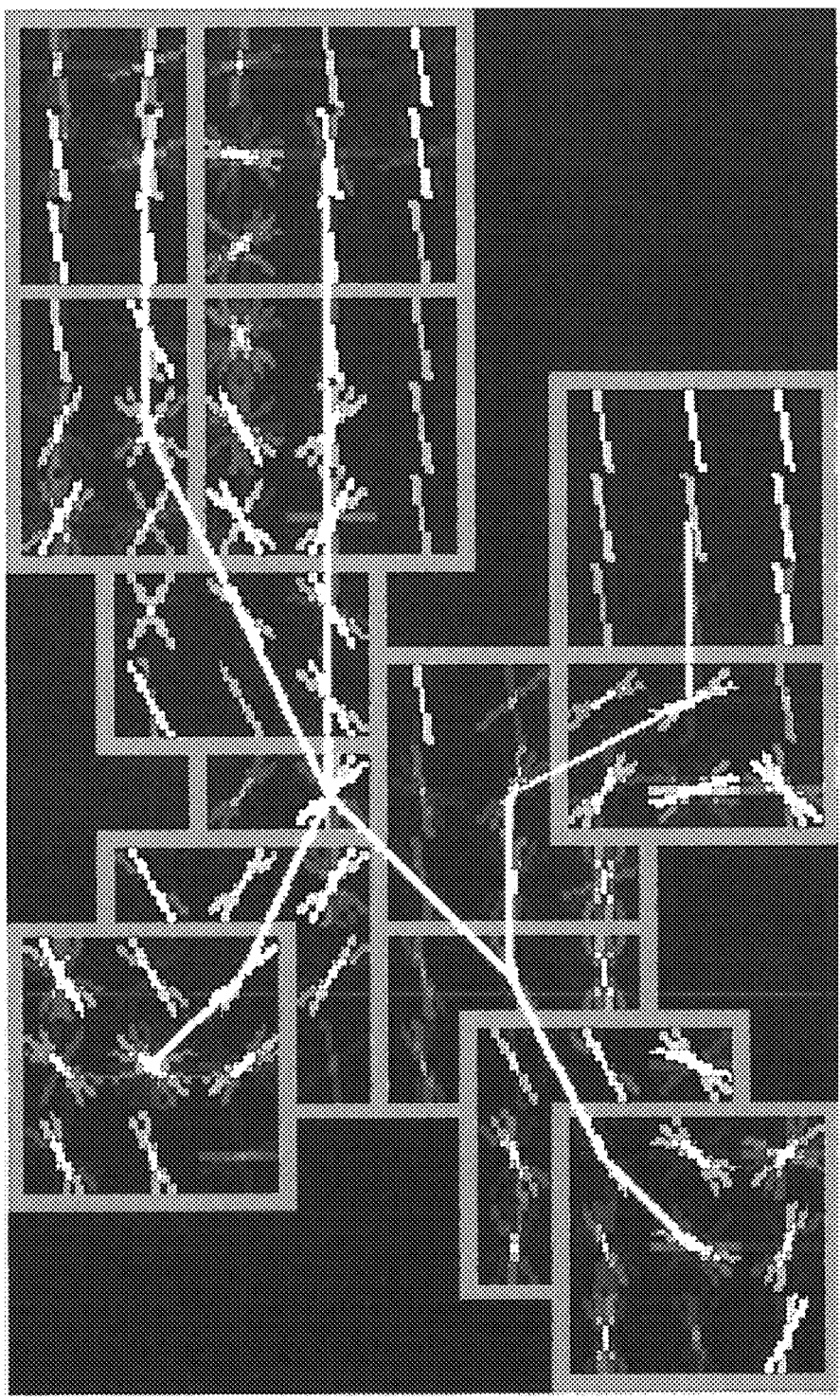
FIG. 6 illustrates vehicle upper portion and vehicle side view portion models for vehicles traversing ROIs defined for order point B, according to an exemplary embodiment of this disclosure.
Figure 7:
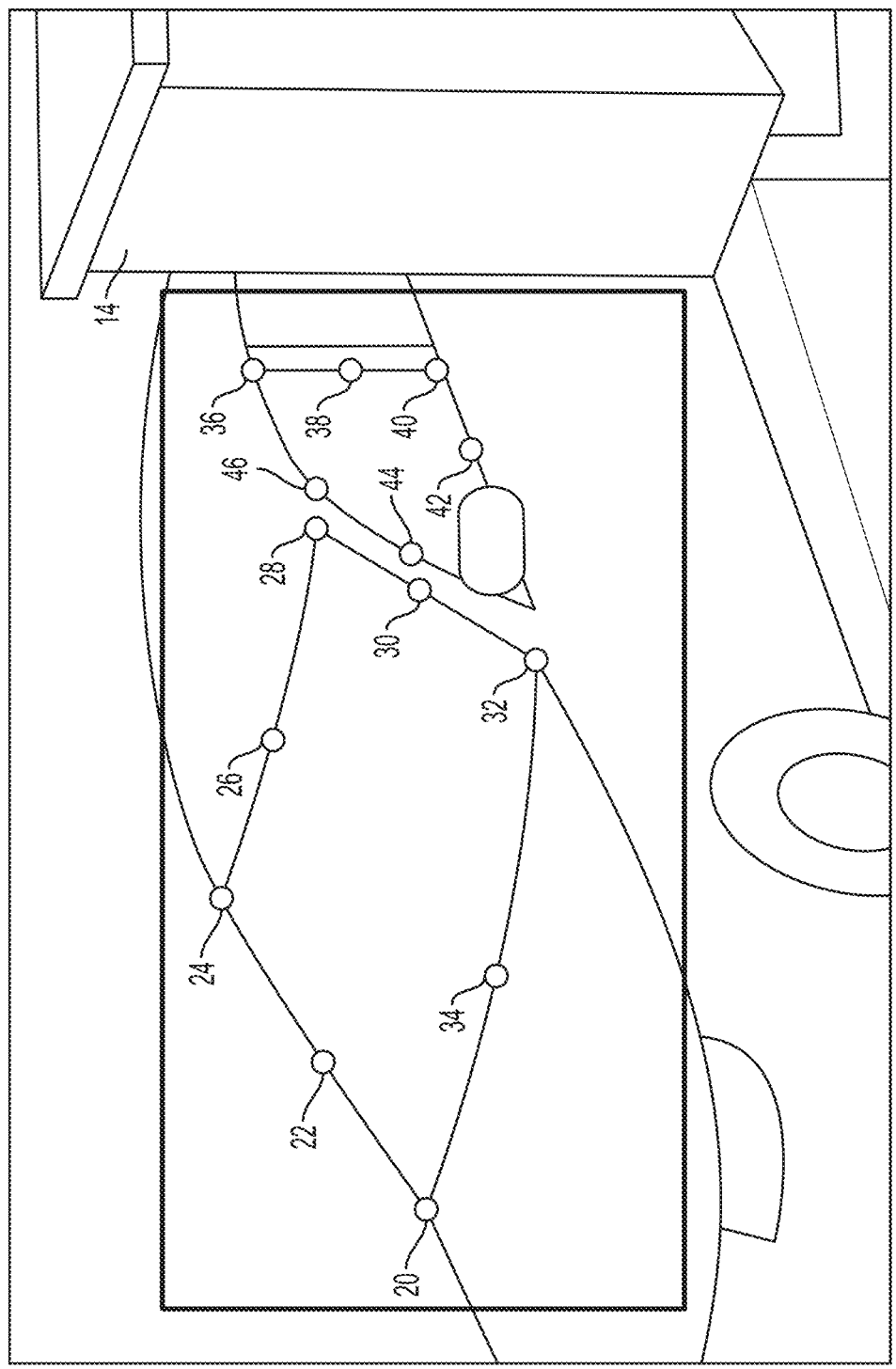
FIG. 7 illustrates detected vehicle portions and the associated detected landmarks for vehicles traversing ROIs defined for order point A, according to an exemplary embodiment of this disclosure.

In this step, in order to make the most effective user of the information at hand two separate models are developed for the vehicles coming from Order Point A 14 (FIG. 5) and Order Point B 16 (FIG. 6). Each of these models focuses on the distinguishing information available between the view at Order Point A 14 and that at Order Point B 16. For the vehicles coming from Order Point A 14, a vehicle upper portion model is developed by locating 14 landmarks 20, 22, 24, 26, 28, 30, 32, 34, 36, 38, 40, 42, 44 and 46 on the boundaries of windshield and side window. The landmarks for the upper portion model are shown in FIG. 7 and the resulting model is shown in FIG. 5. The reason this model is developed for the vehicles coming from Order Point A is because the upper portion of the vehicles is typically not occluded by other vehicles in the scene. This can be seen in FIG. 1 and FIG. 2, where a van 12 partially occludes a sedan 10 but the upper portion of the sedan 10 is still visible.

Hence, the tracker for the sedan is not impacted by the occlusion if it is started on the windshield or side-window of the sedan.

Figure 8:
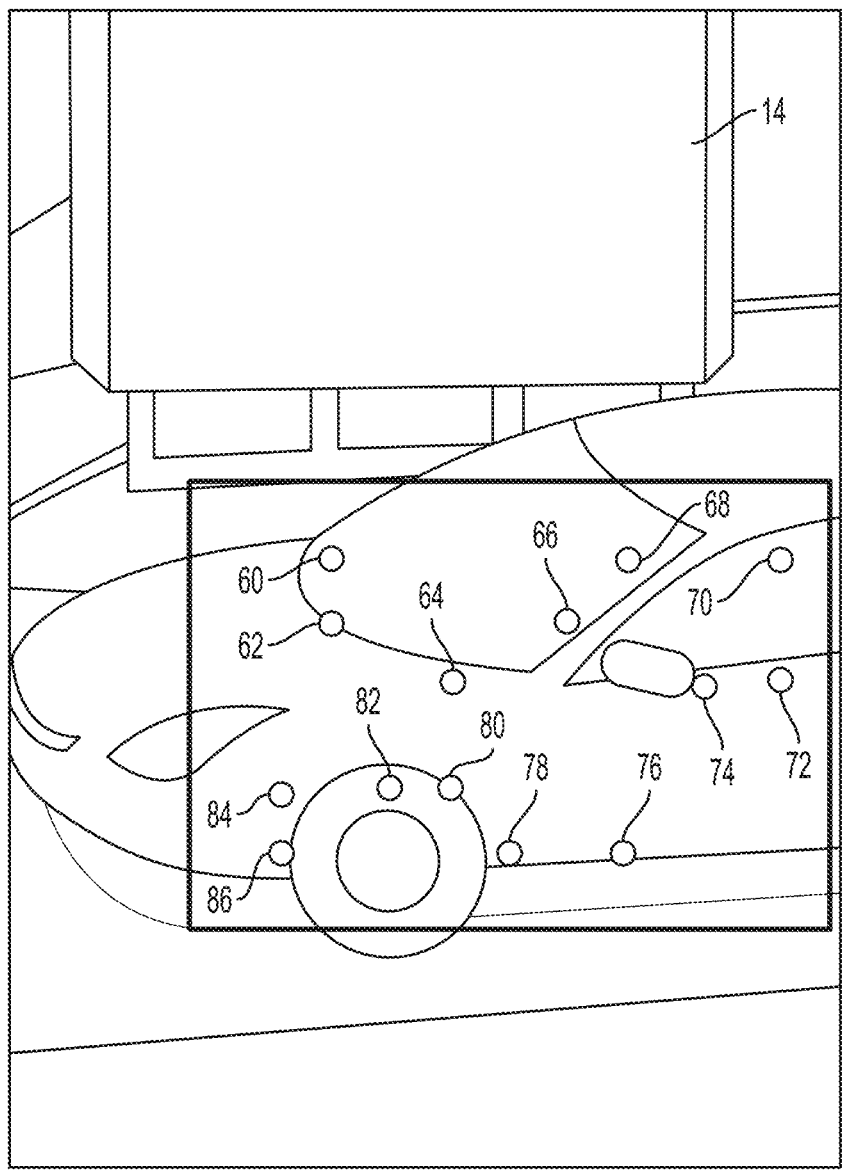
FIG. 8 illustrates detected vehicle portions and the associated detected landmarks for vehicles traversing ROIs defined for order point B, according to an exemplary embodiment of this disclosure.

Another vehicle parts model is developed for the vehicles coming from Order Point B 16. For this purpose, 14 landmarks 60, 62, 64, 66, 68, 70, 72, 74, 76, 78, 80, 82, 84 and 86 are located on the side view of the vehicle as shown in FIG. 8, the landmarks selected from the most distinctive locations on the side view. FIG. 6 shows the resulting side view parts model.

The vehicle upper portion and side view parts models generated during the offline phase, are now used during the operational phase when a candidate frame is identified in the previous step. The vehicle upper portion model performs vehicle detection for the ROI defined for Order Point A 16 and the side view model performs vehicle detection for the ROI defined for the Order Point B.

5) Check if the Detected Vehicle Part is Already being Tracked.

When a vehicle part is detected in a region of interests, the detected part is initially checked to determine if it corresponds to a vehicle part already being tracked. This check is useful because a vehicle at an order point may exhibit different motion in distinct and separated time segments. For example, a vehicle might show stop and go type of motion characteristics at the order point in a high traffic scenario. For this case, a different tracker could erroneously be assigned to the same vehicle for the two separated time segments containing its motion.

This process ensures that only one tracker is assigned to a detected vehicle and hence, reduces false alarms associated with the system. Note that this check can be also done before performing vehicle part detection using deformable parts model in the previous step. Performing the check prior to vehicle part detection will enable to bypass the detection step if a tracker has already started for the vehicle. This check depends on the tracking algorithm used in subsequent processes and can be performed in several ways including the following:

a) If a region based-tracking algorithm is used, e.g., mean shift, particle filtering etc., for tracking, attributes, e.g., color histogram, histogram of oriented gradients etc., from the motion detected region can be extracted and compared with the attributes of the vehicles already being tracked.

b) If a region-based tracking algorithm, e.g., mean shift, particle filtering etc., is used, the distance of the detected motion blob can be calculated to each of the vehicles already being tracked on the image plane. If the detected motion blob is far enough from the vehicles already being tracked then a new tracker is started for the detected vehicle.

c) If a point tracker is used, e.g., KLT (Kanade-Lucas-Tomasi) tracking, for tracking, a set of features can be extracted from the motion detected region and these features are compared with the set of features already being tracked. If more than certain number of features is matched then it can be concluded that the vehicle is already being tracked.

d) If a point tracker is used, e.g., KLT tracking, for tracking, the number of currently tracked features can be calculated in the motion detected region. A new tracker is started only if the number of currently tracked features in the motion detected region is less than a specified threshold. The logic behind this approach is when an already tracked vehicle is moving, the motion detected region will include the tracked vehicle and will contain a set of features already being tracked.

6) Starting a Tracker for the Non-Occluded Portion of the Vehicle and Tracking it Across Video Frames.

If the detected vehicle part is not in the list of vehicle parts already being tracked, a set of attributes/features are extracted from the vehicle-part-detected region. The extracted attributes/features depend on the type of the tracker used. If a point tracker, e.g., KLT, is used for tracking, the extracted features may include one or more of the following:

a) Scale invariant features such as scale invariant feature transform (SIFT) [13,19] features or speeded up robust features (SURF, see BAY et al., "SURF: Speeded Up Robust Features", Computer Vision and Image Understanding, V. 110.3, 2008, p 346-359.

b) Interesting points such as Harris corner features, see HARRIS et al., "A Combined Corner and Edge Detector", Alvey Vision Conference, Vol. 15, 1988, p 147-152, fast accelerated segment test (FAST), see ROSTEN et al., "Machine Learning for High-Speed Corner Detection", Computer Vision ECCV 2006, p 430-443, or minimum eigenvalue algorithm features, see TOMASI et al., "Detection and Tracking of Point Features", Technical Report CMU-CS-91-132, Carnegie Mellon University, School of Computer Science, 1991.

c) Maximally stable external region (MSER) features, see PILLAR, Real Value in Video Analytics, Integrated Solutions for Retailers, Jul. 26, 2010, http://www.retailsolutionsonline.com/doc/real-value-in-video-analytics-0001.

If a region-based tracker is used (e.g., mean shift, particle filtering etc.) for tracking, the set of extracted attributes include one or more of the following:

d) Color attributes of the detected region (e.g., color histogram or other color statistics extracted from the region)

e) Geometric attributes of the detected blob (e.g. orientation, aspect ratio, eccentricity, etc.)

f) Shape attributes extracted from the detected region (e.g., DALAL et al., "Histograms of Oriented Gradients for Human Detection", 2005, histogram of edges, corners, etc.).

After extracting a set of features/attributes from the detected region, they are tracked across the frames of the captured video. The tracking is performed as long as the vehicle stays within FOV of the camera. Several alternative tracking techniques such as Mean-Shift Tracking, see Comaniciu et al., "Real-Time Tracking of Non-Rigid Objects Using Mean Shift", Proceedings of IEEE Conference on Computer Vision and Pattern Recognition, 2000, p 142-149, Contour Tracking, see Kass et al., "Snakes: Active Contour Models", International Journal of Computer Vision, 1988, p 321-331, Kalman filtering, and KLT tracking and Particle Filtering, see Gustafsson et al., "Particle Filters for Positioning, Navigation and Tracking", IEEE Transactions on Signal Processing, 2002, can be employed in this step.

Now is described an automated method and system for updating and correcting an event sequence when subjects randomly merge into a single queue lane after placing their respective event requests while in multiple queue lanes where vehicle detection and tracking is performed using a deformable parts model as previously described.

A "subject" as contemplated herein can include a vehicle or pedestrian, and the like, that generally waits its turn in a queue(s) to receive a customized good and/or service ("event fulfillment") after placing a custom/individual request and/or order for the event. For illustrative purposes, the subjects referred to herein include vehicles, each being associated with a customer purchasing an item. However, there is no limitation made herein to the 'subject' and the end-purpose of the queue.

A "merge point" as contemplated herein is a region defined in the camera field of view where a subject enters and/or merges into a single queue lane from one of multiple queues and is now considered to be part of the queue approaching an end-event point. For illustrative purposes, the merge point referred to herein can include a region where a vehicle enters and/or merges into a single queue lane from one of multiple queues after placing an order at one of multiple side-by-side order points, and is now considered to be part of the queue approaching the service (payment and pick-up) windows.

Figure 9:
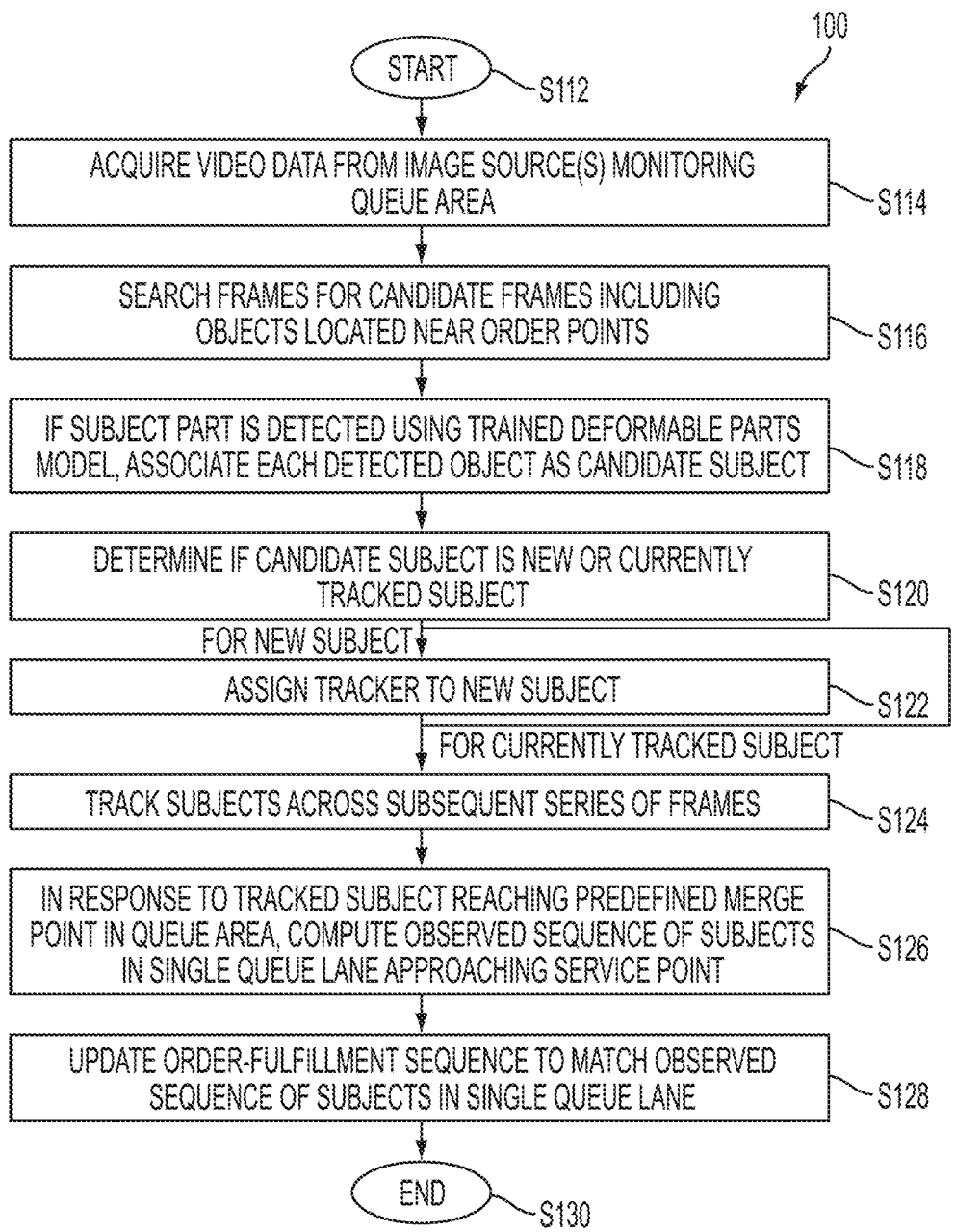
FIG. 9 is a flowchart describing an overview of a method for updating an order sequence according to the present disclosure.

FIG. 9 is a flowchart describing an overview of a method 100 for updating an order sequence according to the present disclosure. The method starts at S112. The system acquires video data from at least one image source monitoring a region of interest ("queue area") at S114. The video data is generated from at least one video camera having an individual or combined field of view that includes two or more order points in separate queues and a merge point where the separate queue lanes later merge into a single queue lane. The system searches the frames, or regions of interest (ROI) defined in the frames, for objects located at least near the order points in frames of the video data at S116 to acquire candidate frames. In one embodiment, the system can search the frames in response to an order being placed by a subject in one of the queue lanes. Alternatively, the system can continuously search for foreground or moving objects of interest located at least near a ROI of the order points. In this case, the system associates objects nearest the order point with an order placed at that order point. Embodiments are also contemplated where the subjects do not place orders at an order point. In these embodiments, the order points can be replaced with start points, and some trigger can initiate the searching at each start point, as long as a queue forms at each of the multiple start points and then come together at a merge point. In the discussed embodiments, existing model-based approaches for background subtraction or motion detection can be used to detect the objects, which identify candidate frames. Next, if a subject, e.g., vehicle, part is detected using a trained deformable parts model, the system associates each detected object as a candidate subject at S118. In one embodiment, the system can also associate an (e.g., order) identifier with the candidate subject at the order point. Generally, the system next determines whether the candidate subject was previously assigned a tracker or is new to the scene at S120. Mainly, the approach used for making this determination includes computing a descriptor or value, such as an attribute, a distance from other subjects, a set of features, and/or a number of tracked features in the region, etc., describing the appearance of a candidate subject and comparing the descriptor/value to thresholds or corresponding descriptors of other subjects currently being tracked. The descriptor/value that is computed is based on the type of tracking algorithm that is being applied by the system. Similarly, the tracking algorithm applied by the system can be dependent on the deformable parts model-based approach, described herein, used for detecting the candidate objects. Based on the results of the comparison, the system classifies each candidate subject as belonging to one of a new subject-of-interest and a currently tracked subject classes or categories. In response to the candidate subject being classified as a new subject-of-interest, the system assigns a tracker to the new subject at S122. The movement of each subject is tracked in and around the monitored queue area over the subsequent series of frames at S124. Generally, each tracked subject is followed across the series of frames until its location meets a predetermined/predefined merge point where the multiple queues converge into the single queue lane. In response to the tracked subject reaching the predefined merge point, the system computes an observed sequence of subjects approaching the service point at S126. This observed sequence corresponds to when the tracked subject transitioned into the single queue lane relative to the other tracked subjects. The system then updates the sequence of orders to match the observed sequence of subjects in the single queue lane at S128. In one embodiment, the order identifier is associated with the tracker and follows the subject across the series of frames. The system can use the order identifiers to compute the updated order sequence so that the orders can be fulfilled in the sequence that is anticipated for each subject to reach the service point. The method ends at S130.

Figure 10:
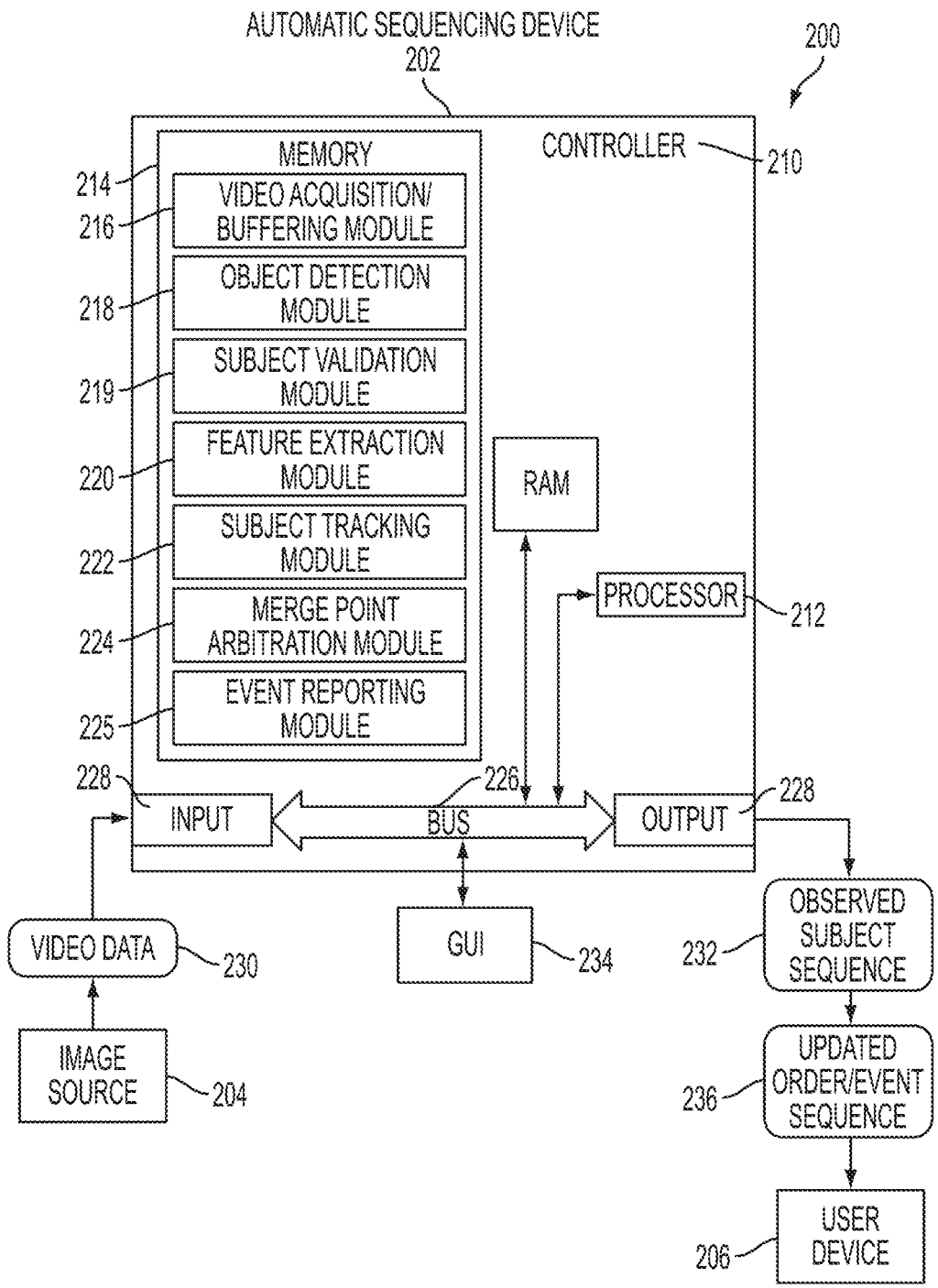
FIG. 10 is a schematic illustration of a vision-based system for automatically generating an order sequence matching a sequence in which multiple subjects transition into a merged queue lane.

FIG. 10 is a schematic illustration of a vision-based system 200 for automatically generating an order sequence matching a sequence in which multiple subjects transition into a merged queue lane. The system 200 includes an automatic sequencing device 202 and an image source 204 linked together by communication links, referred to herein as a network. In one embodiment, the system 200 may be in further communication with a user device 206. These components are described in greater detail below.

The automatic sequencing device 202 illustrated in FIG. 10 includes a controller 210 that is part of or associated with the device 202. The exemplary controller 210 is adapted for controlling an analysis of image frames or video data (hereinafter "video data") received by the system 200. The controller 210 includes a processor 212, which controls the overall operation of the device 202 by execution of processing instructions that are stored in memory 214 connected to the processor 212.

The memory 214 may represent any type of tangible computer readable medium such as random access memory (RAM), read only memory (ROM), magnetic disk or tape, optical disk, flash memory, or holographic memory. In one embodiment, the memory 214 comprises a combination of random access memory and read only memory. The digital processor 212 can be variously embodied, such as by a single-core processor, a dual-core processor (or more generally by a multiple-core processor), a digital processor and cooperating math coprocessor, a digital controller, or the like. The digital processor, in addition to controlling the operation of the device 202, executes instructions stored in memory 214 for performing the parts of the method outlined in FIGS. 9, 11A and 11B. In some embodiments, the processor 212 and memory 214 may be combined in a single chip.

The device 202 may be embodied in a networked device, such as the image source 204, although it is also contemplated that the device 202 may be located elsewhere on a network to which the system 200 is connected, such as on a central server, a networked computer, or the like, or distributed throughout the network or otherwise accessible thereto. In other words, the processing can be performed within the image source 204 on site or in a central processing offline or server computer after transferring the video data through a network. In one embodiment, the image source 204 can be a device adapted to relay and/or transmit the video data 230 to the device 202. In another embodiment, the video data 230 may be input from any suitable source, such as a workstation, a database, a memory storage device, such as a disk, or the like. The image source 204 is in communication with the controller 210 containing the processor 212 and memories 214.

The stages disclosed herein are performed by the processor 212 according to the instructions contained in the memory 214. In particular, the memory 214 stores a video buffering module 216, which acquires video data from a video of the queue area; an object detection module 218, which detects candidate subjects in multiple queues included in a queue area; a feature extraction module 220, which extracts features for each new subject, a subject tracking module 222, which tracks the location of each detected subject in and around the monitored queue area until the tracked subject reaches a predetermined/predefined merge point; a merge point arbitration module 224, which computes an observed sequence of subjects approaching the service point in response to the tracked subject reaching the predefined merge point, the system; and, an event reporting module 225, which updates the sequence of orders-for-fulfillment to match the observed sequence of subjects in the single queue lane. Further contemplated embodiments can also include a subject validation module 219, which determines if each candidate subject is a new subject or a currently tracked subject. Embodiments are contemplated wherein these instructions can be stored in a single module or as multiple modules embodied in different devices. The modules 216-225 will be later described with reference to the exemplary method.

The software modules as used herein, are intended to encompass any collection or set of instructions executable by the device 202 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 202 may be all connected by a bus 226.

With continued reference to FIG. 10, the device 202 also includes one or more communication interfaces 228, such as network interfaces, for communicating with external devices. The communication interfaces 228 may include, for example, a modem, a router, a cable, and and/or Ethernet port, etc. The communication interfaces 228 are adapted to receive the video data 230 as input.

The device 202 may include one or more special purpose or general purpose computing devices, such as a server computer, controller, or any other computing device capable of executing instructions for performing the exemplary method.

FIG. 10 further illustrates the device 202 connected to the image source 204 for acquiring and/or providing the video data in electronic format. The source 204 (hereinafter "video camera 204") may include one or more surveillance cameras that capture video from the scene (queue area) of interest. The number of cameras may vary depending on an extension and location of the queue area being monitored. Multiple cameras may be required where the length of a queue easily extends beyond a single camera field of view. It is contemplated that the combined field of view of multiple cameras typically comprehends the entire area surrounding the order/start points to the merge point. For performing the method at night in areas without external sources of illumination or with irregular illumination from ambient sources, the video camera 204 can include near infrared (NIR) capabilities.

Furthermore, the video camera 204 used in the present disclosure is operative to capture video at a frame rate that is able (sufficiently high enough) to handle one or more subjects moving through the scene at anticipated speeds.

With continued reference to FIG. 10, the video data 230 undergoes processing by the device 202 to output the observed subject sequence 232 and/or the updated order sequence 236.

Furthermore, the system 200 can display the output in a suitable form on a graphic user interface (GUI) 234. The GUI 234 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 212. Alternatively, the device 202 can provide the output to a user device 206, which can display the output to a user, such as the users taking payment and/or fulfilling the orders. Furthermore, in one contemplated embodiment, the observed subject sequence 232 and/or the updated order sequence 236 can be transmitted to another computer application, which can perform additional processing on the data for redesigning throughput models to maximize efficiency and profit potentials.

Figure 11A:
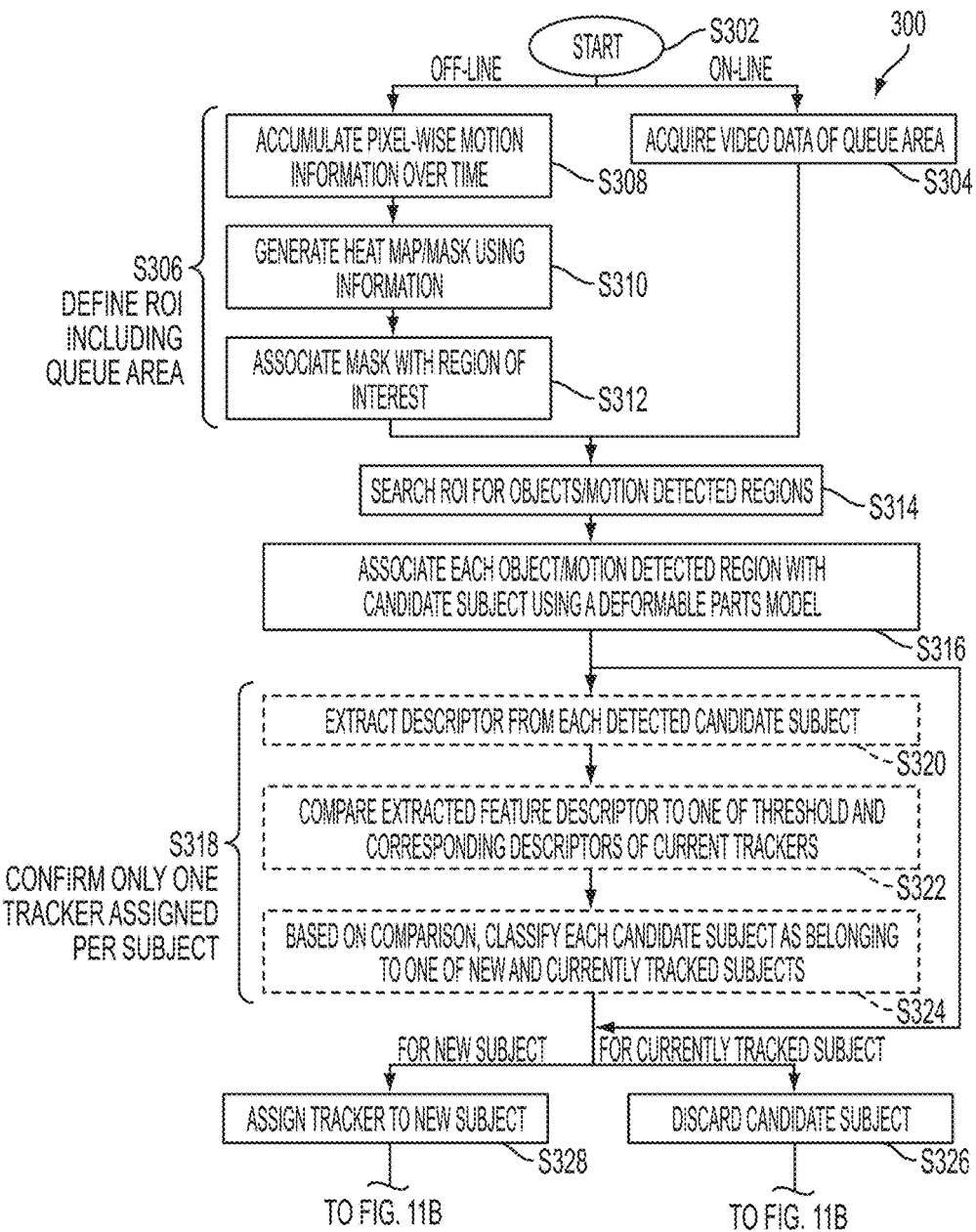
FIG. 11A-B is a detailed flowchart describing a method for automatically generating an event sequence matching a sequence in which multiple subjects merge from multiple queues into a single queue.
Figure 11B:
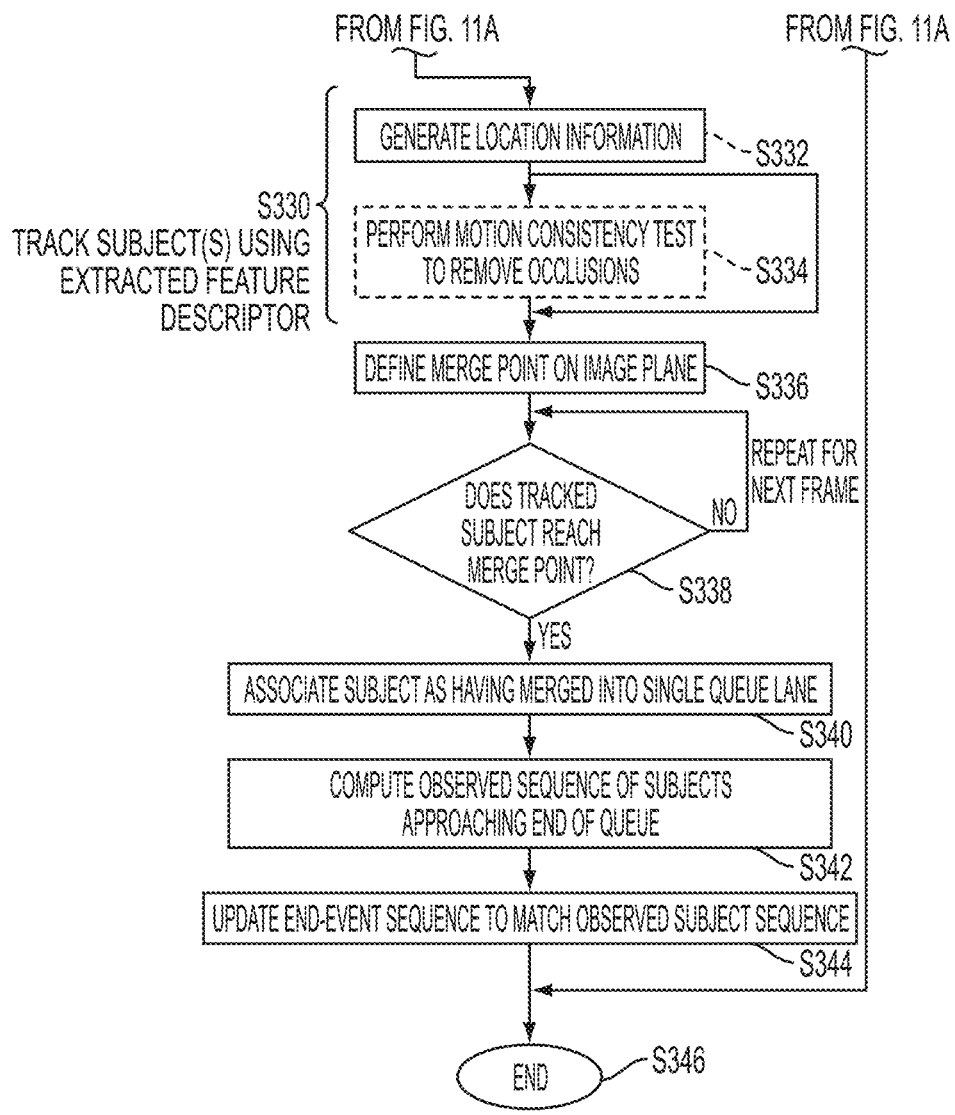
Figure 12:
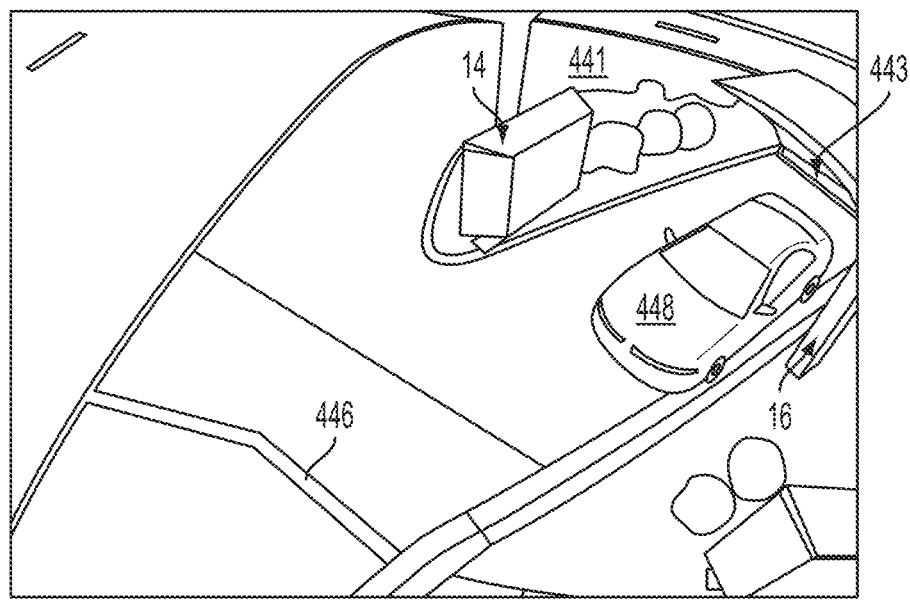
FIG. 12 shows a sample image frame including a queue area in a camera field of view.

FIG. 11A-B is a detailed flowchart describing a method 300 for automatically generating an event sequence matching a sequence in which multiple subjects merge from multiple queues into a single queue. The method starts at S302. The system acquires video data from at least one image source monitoring a region of interest ("queue area") at S304. The video data is generated from at least one or more video cameras having an individual or combined field of view that includes two or more start points in separate queues and a merge point where the separate queue lanes later merge into a single queue lane. An example image frame is illustrated in FIG. 12, where the present method can be implemented in a fast-food drive-thru. In this illustrated example, the start points include side-by-side order entry points 14, 16 that correspond to the locations of menus where orders are placed using microphones. The merge point 446 is marked as a line in the image space (see 446 in FIG. 12). The video camera(s) includes an individual or combined field of view wide enough to capture a subject's (vehicle 448 in FIG. 12) movement at least from the start point to the merge point. The camera(s) field of view(s) can cover additional regions of the queue area including the entry portions 441, 443 of the separate queues located before the start points, i.e., where subjects enter either one of the separate queues, and the end portion of the single queue located after the merge point, such as at the service point.

The video data can be acquired directly from the video camera(s) or from an intermediate image source that stores and/or relays the video data from the video camera. Regardless, a placement of the video camera can be fixed close to the start and merge points to avoid and/or minimize occlusions observed in the scene. In one embodiment, the video camera can be mounted above the queue area to capture a general top-view of the start and merge points, particularly to avoid subjects moving in a first queue (located closer to the video camera) from obstructing subjects moving in a second (located farther from the video camera). However, the disclosure contemplates that the video buffering module 216 can support geometries for video data acquired from video cameras placed elsewhere. In other words, the system disclosed herein can process video data acquired from cameras included in existing surveillance infrastructure.

Returning to FIG. 11A, the video buffering module 216 transmits the video frames acquired from the video data to the subject detection module 218 for processing. The module 218 can process each frame, or every n-th frame, in the sequence. Similarly, the module 218 can process the entire image frame or a region of interest (ROI) defined in the frames. More particularly, the ROI can include a ROI of the image frame where new objects are anticipated to appear in the queue area, such as at the start point or the queue portions located right before the start points. One aspect of processing designated ROIs is that it prevents a detection of subjects ("false detections") appearing and/or moving beyond the queue area. By defining ROIs in the image frames, the system can limit the computational burden of the subject detection phase (given a real-time requirement to keep up with traffic flow) and can reduce the number of false detections.

Therefore, a ROI including the queue area can be defined in one contemplated embodiment at S306. The ROI can be defined manually by a user when the video camera is set up and calibrated. This ROI can be defined once since the queue area does not change as long as the video camera remains fixed. As the camera settings change (e.g., because of zoom, pan, tilt or translation), the defined area can be updated during a recalibration procedure.

In another embodiment, the ROI(s) can be identified in an offline learning phase. Because a majority of traffic occurs in the queue area situated between the start points and the merge point, the system can identify the queue area by searching for motion (for example, using frame differencing or a model-based approach) in the entire scene over time. Particularly, the module 220 can accumulate pixel-wise motion information at each pixel location over time at S308 and generate a heat map (representing the trajectory of subjects' movement) using this information.

Figure 13:
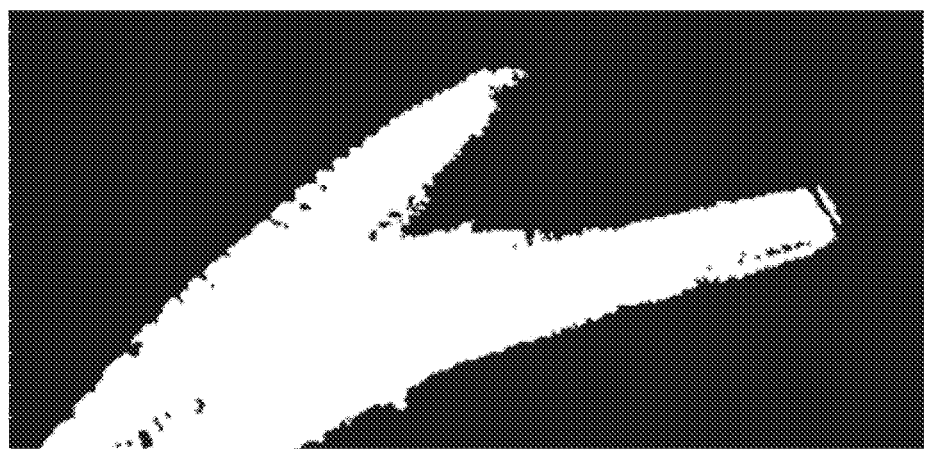
FIG. 13 shows a sample mask generated for the image frame shown in FIG. 12.

The module 220 can furthermore eliminate objects detected outside the queue area-of-interest ("outliers") by performing a thresholding operation on the heat map. Particularly, the module 220 can generate a mask representing the heat map at S310, and then discard any objects that are subsequently detected outside the highlighted region. FIG. 13 shows a sample mask generated for the image frame shown in FIG. 12. The module 218 then associates the mask with the ROI (queue area-of-interest) at S312.

This learning approach can be used to remove large amounts of extraneous background noise or "phantom" objects. Alternate embodiments can apply a distance from a center of these learned routes to determine the likelihood a potential new object-of-interest will be detected.

Returning to FIG. 11A, the subject detection module 218 searches the defined ROI(s) (or entire frames) for moving foreground objects at S314. Foreground object detection in video can be achieved via a number of different methods. Two common methods of motion detection used in applications that perform analytics on video data include frame-to-frame differencing and background estimation and subtraction ("background subtraction"). The frame differencing approach detects moving objects within the camera field of view by computing pixel-wise differences between successive frames in the video stream, typically requiring tuning to a very narrow range of object speed relative to the frame rate and camera geometry. By thresholding these differences, areas containing moving objects ("motion detected regions") can be easily identified.

Alternatively, model-based approaches for motion/foreground detection can be used. In one embodiment, the system 100 performs the background subtraction approach.

The background subtraction approach detects foreground objects rather than moving objects. However, moving objects also trigger foreground detection because their appearance differs from the background estimate. For example, when an image of the background, without any foreground objects, is available, a model is trained to estimate common pixel values. Mainly, background subtraction computes the absolute intensity/color difference between the known or estimated background model and each current frame in the video sequence. By comparing each current frame to the background model, the pixels of which the computed distance in the intensity/color space does not meet a predetermined threshold value are classified as background pixels and the pixels of which the computed distance in the intensity/color space meets and exceeds the threshold (i.e., do not fit the existing background model) are classified as foreground pixels. The detected foreground pixels indicate a foreground object/motion detected region.

Strategies used to maintain a background model or estimate include a historical statistical model (e.g., a parametric descriptor density model, such as, Gaussian Mixture Models (GMM) based approach or a non-parametric descriptor density model, such as, a kernel-based estimate) for each pixel is constructed, eigenbackgrounds (which use principal component analysis), computation of running averages (that gradually update the background after each next frame), and median filtering, etc. The background models are typically adjusted dynamically to account for slow variations in the background of the scene. In the contemplated embodiment, the background estimate can be continuously updated with each incoming frame at a rate controlled by a predetermined learning rate factor. However, embodiments are contemplated where the background estimate can be updated at slower rates. Other alternatives are also contemplated for constructing the current background model.

A binary mask/difference image (i.e., a foreground object mask) is generated using the pixel classifications. In one embodiment, a morphological operation that is understood in the art can be applied to the difference image to filter out sources of fictitious motion and to accurately detect pixels associated with foreground or moving objects. An example filtering technique can include applying dilation and closing operations to fill in holes in the binary mask and to bridge small gaps in regions where an object has been erroneously split into a number of smaller, separate foreground elements. Connected component analysis (CCA) can also be used to eliminate small, extraneous regions where motion is detected in the binary mask. These motion detected regions can result from foreground objects that are too small to be of interest (e.g., a bird flying through the scene) or from general image noise. Common features used in the CCA screening are object area, angle of orientation, and fill density.

At S316, the module 218 associates each detected object/motion detected region with a candidate subject-of-interest using a trained deformable parts model. Because the module 218 may detect object parts corresponding to the same object/motion region in multiple frames, the subject validation module 219 can confirm that only one tracker is assigned per candidate subject at S318. To avoid "multiple sightings" of the same subject from being treated as multiple candidate subjects, the subject validation module 219 ensures that only one tracker is assigned to each detected subject. By managing the tracker assignments, the module 219 essentially prevents multiple trackers from being assigned to the same subject detected over multiple frames. One aspect of this validation procedure is that it can reduce the computational load needed in the tracking stage. Another aspect of this validation procedure is that it can reduce the number of erroneous event sequence detections.

The module 219 extracts a descriptor for each candidate subject at S320. Because the system applies one tracking algorithm in the contemplated embodiment, the descriptor corresponds with the selected tracking approach.

Example tracking algorithms contemplated herein include region-based tracking algorithms and point trackers. Examples of region-based tracking algorithms can include mean shift and particle filtering. Example descriptors that can be extracted for the region-based tracking algorithms include attributes such as color histograms and/or histograms of oriented gradients, etc., and the distance of the detected motion region to each currently tracked subject. Mainly, these tracking algorithms consider the entire subject as a region. An example of a point tracker can includes KLT tracking. Example descriptors that can be extracted for point trackers includes a set of features from the motion detected region or a number of currently tracked features in the motion detected region. Mainly, point trackers consider sets of localized entries, such as hard edges, corners, and interest points of the candidate subject (foreground object).

The module 219 compares each descriptor to one of a predetermined threshold and currently tracked descriptor at S322. Based on the comparison, the module 219 classifies each candidate subject as belonging to one of a new subject and a currently tracked subject at S324.

For region-based tracking algorithms, if the extracted descriptor is an attribute of the candidate subject, the attribute is compared with the attributes of currently tracked subjects. In response to the attributes of the motion detected region not matching the attributes of any currently tracked subject, the module 219 classifies the candidate subject as belonging to a new subject. In response to the attributes of the motion detected region matching the attributes of a currently tracked subject, the module 219 classifies the candidate subject as belonging to a currently tracked subject.

If the extracted descriptor is the computed distance between the motion detected region and each currently tracked subject on the image plane, the computed distance is compared to a predetermined distance threshold. In response to the computed distance meeting and exceeding the predetermined threshold, the module 219 classifies the candidate subject as belonging to a new subject. In response to the computed distance not meeting the predetermined threshold, the module 219 classifies the candidate subject as belonging to a currently tracked subject.

For point trackers, if the extracted descriptor is a set of features from the motion detected region, the set of features is compared to the sets of features of currently tracked subjects. The number of matching features is counted. In response to the number of features not meeting a predetermined threshold number, the module 219 classifies the candidate subject as belonging to a new subject. In response to the number of features meeting and exceeding the predetermined threshold number, the module 219 classifies the candidate subject as belonging to a currently tracked subject.

Similarly, if the extracted descriptor includes a number of currently tracked features in the motion detected region, this number is compared to a predetermined threshold. In response to the number of currently tracked features not meeting a predetermined threshold number, the module 219 classifies the candidate subject as belonging to a new subject. In response to the number of currently tracked features meeting and exceeding the predetermined threshold number, the module 219 classifies the candidate subject as belonging to a currently tracked subject. The logic behind this approach is when vehicle being tracked is moving, the motion detected blob will overlap with the tracked vehicle and will contain a set of features already being tracked.

One embodiment is contemplated however which performs the validation independent of the tracking mode. For example, once the subject detection module 218 detects a candidate subject, the module 219 can determine whether that the detected candidate subject overlaps a predetermined percentage of the detected candidate subject in a next frame. In response to the overlap meeting and exceeding the predetermined percentage, the module 219 can determine the number of consecutive frames that the overlap threshold is met. In response to the number of consecutive frames meeting and exceeding a predetermined threshold number, the module 219 classifies the candidate subject as belonging to a new subject. In response to the number of consecutive frames not meeting the predetermined threshold number, the module 219 classifies the candidate subject as belonging to a currently tracked subject. In one embodiment, the threshold number can be five (5) consecutive image frames.

In response to the candidate subject being classified as belonging to a currently tracked subject, the module 219 discards the subject at S326. However, a feature extraction module 220 assigns a tracker to each new subject at S328. More specifically, the module 220 assigns the descriptor (attributes or features) extracted at S320 to the tracker. However, for embodiments that omit the validation procedure (S318-S324), a descriptor is extracted for each new subject. As mentioned supra, the descriptor can be based on the tracking algorithm later applied by the system. For example, if a point tracker such as KLT is applied, then the extracted features can be selected from a group consisting: Harris corners, scale-invariant feature transform (SIFT) features, and speeded-up robust features (SURF). Likewise, if a region-based tracker such as mean-shift is to be used, then the extracted features can include color attributes of the object region, such as a color histogram.

The features can be extracted from either color or gray-scale images. In embodiments where NIR illumination is used, the module 220 can extract Harris corner features or gray-level histograms from grayscale images.

Alternatively, in one embodiment, a template of the detected motion region (i.e., a cropped sub-image of the new subject-of-interest) can be used as a set of features.

The extracted descriptor (hereafter "features") is transmitted to the vehicle tracking module 222, which tracks the extracted features across subsequent frames in the video stream at S330. The tracking algorithm used by the module 222 processes features that are consistent with the ones extracted by the previous modules 219, 220. As mentioned supra, the module 222 can apply one of a number of different tracking approaches including, but not limited to mean-shift tracking, contour tacking, Kalman filtering, KLT tracking, and particle filtering, etc. Generally, the module 220 determines the location of each tracked subject across subsequent frames at using the trackers. The module 220 anticipates that the subjects move with the queue in the scene, and the locations therefore change over time. For each frame that a subject remains within the camera (or combined cameras) field of view, the module 220 generates tracking data describing the location of the subject in pixel coordinates at S332.

In one embodiment, the module 220 can perform a motion consistency test at S334 to verify that the movement of the tracked features is consistent with that of a rigid object. By monitoring the overall motion/movement of the set of features for a given subject, features which are not moving jointly with the set, i.e., features which were initially extracted from the motion detected region but have drifted onto other elements of the scene at some point, are identified and removed from the feature set. This test can be performed, for instance, to detect initial features that were erroneously chosen on background areas immediately surrounding the tracked subject-of-interest or to remove features corresponding to another subject or object that occludes the camera's view of the tracked subject. Particularly, this removal occurs when one of the first and second vehicles moves from its initial location, or as both vehicles move in slightly different directions. This type of pruning can produce a smoother, more robust tracking performance and improve the overall accuracy of the present system, particularly for queue configurations having a close-quarters layout and a large number of start-and-stop events.

For an illustrative example, in an embodiment where the tracking approach used by the system includes a KLT point tracker with Harris corner features, the set of tracked Harris corner feature points can be adjusted dynamically (pruned) to account for features which are not "well-behaved".

In one alternate tracking embodiment, a template of the detected motion region (i.e., a cropped sub-image of the new subject-of-interest) can be used as a set of features. A template matching approach is used to locate the best match for this template in a subsequent frame. The template is updated each time a new location is determined in order to deal with slowly varying illumination, pose, etc.

The subject tracking module 222 transmits the tracking data/location information to the merge point arbitration module 224. For a given frame, the merge point arbitration module 224 can define a location of the merge point region at S336. Alternatively, a virtual line can be defined on the image plane. This step can be executed once since the merge point does not change as long as the camera configuration and queue configuration remain the same.

Using the location information associated with each tracked subject, the module 224 determines if the tracked subject reaches or passes the defined merge point at S338. In response to the tracked subject crossing into the merge point region of the given image frame (YES at S338), the module 224 associates the subject as being merged into the single queue at S340. At this point, the module 224 can discontinue tracking that subject in subsequent frames. In response to the tracked subject not reaching the merge region of the given image frame (NO at S338), the module 224 continues to receiving tracking data from the subject tracking module 222 for that subject, and repeats the determination at S338 for the next frame being processed.

The determination at S338 can compute and compare any statistic of the tracked feature locations to the location of the merge point. For example, in one embodiment a single point can be computed from the location information that roughly identifies the position of the tracked subject. For point trackers, such as a KLT tracker, this single point can be the centroid of the tracked feature locations. Other example statistics can include a centroid, a median center location, a first point, a predetermined percentage in the feature points, and a last point, etc. that pass into the merge point region. Alternatively, the module 224 can compute a convex hull containing the points being tracked. The module 224 can detect the merge event when a predetermined percentage of overlap between the hull and a defined merge region occurs. A similar approach can be used when kernel- or region-based trackers are applied by the system, where the overlap between the kernel of the tracker and the merge region can be measured, and a merge event is triggered when a degree of the overlap meets and exceeds a predetermined threshold.

Once the subject is classified as having merged into the single queue at S340, the module 224 computes an observed sequence of subjects approaching the service point at S342. As part of this computation, the module 224 essentially computes where the tracked subject-of-interest places in the observed sequence of subjects. The module 224 can transmit this computed observed sequence to the event reporting module 225.

Because the system tracks subjects from their respective order entry points, the event reporting module 225 can determine a correct sequence of information associated with each subject (such as "orders" in the illustrated embodiment) that matches with the observed sequence. The module 225 corrects and/or updates the end-event sequence at S344. In the illustrated example, the end-event can include the orders that need to be fulfilled at one or both of a payment and pick-up point. Particularly, the module 225 can update the end-event sequence using the identifier assigned to each subject when said subject was detected. Because the identifier followed the subject with the tracker, the module 225 can update the sequence to fulfill the event associated with each identifier in the same sequence that the subject will arrive at the end point.

The module 225 can provide this updated sequence to a user computer device 206, such as the restaurant point of sale (POS) system in the illustrated example. In summary, the module 225 translates each new merged subject into a message to the user device. In alternate embodiments, the event-reporting module 225 may also report non-merge events. These non-merge events may indicate when subjects depart from or cut into the queue. The method ends at S346.

The re-sequencing information computed by the present disclosure is amenable to like environments where a process is initiated in side-by-side queues and completed in a single-lane queue after the side-by-side queues converge, and particularly where process and its output follows the person in the queue. Non-limiting examples of businesses that can employ the present disclosure include banks (indoor and drive-thru teller lanes), grocery and retail stores (check-out lanes), airports (security check points, ticketing kiosks, boarding areas and platforms), restaurants (such as fast food counters and drive-thrus), theaters, carwashes, and the like, etc.

Although the method 300 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 200, wherein the disclosure is not limited to the specific applications and embodiments illustrated and described herein.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method for updating an event sequence including tracking one or more partially occluded vehicles in a queue area captured with one or more image capturing devices, the method comprising:
   a) acquiring video of the queue area from the one or more image capturing devices, the video including a plurality of video frames;
   b) receiving a number of individual event requests from multiple subjects, each event request being received by a subject in a vehicle located in one of multiple queues in the queue area and at least one vehicle including an occluded portion and a non-occluded portion, the occluded portion occluded by another vehicle located in another queue at least near a predefined merge point associated with the queue area;
   c) processing one or more of the video frames and at least one region of interest (ROI) associated with the video frames to detect vehicles located near at least one defined start point, the process using one or more elastic deformation models to detect the non-occluded portion of the vehicle including the occluded portion, each start point corresponding to one of the multiple queues in the queue area;
   d) tracking a movement of each detected vehicle through the queue area over a subsequent series of frames using the elastic deformation model to track the non-occluded portion of the vehicle including the occluded portion;
   e) determining if a location of a tracked vehicle corresponds to the predefined merge point associated with the queue area where the multiple queues in the queue area converge into a single queue lane;
   f) in response to the tracked vehicle reaching the predefined merge point, computing an observed sequence of where the tracked vehicle is sequentially positioned relative to other vehicles past the merge point and approaching an end-event point in the single queue lane; and
   g) updating a sequence of the events to match the observed sequence of vehicles in the single queue lane, wherein the queue area includes a fast-food-drive-thru, the event-requests include food orders, and the end-events include one of goods and services.

2. The computer implemented method according to claim 1, wherein prior to step d), the method comprises:
   checking if the detected non-occluded portion of the vehicle is already being tracked.

3. The computer implemented method according to claim 1, wherein prior to step b), the method comprises:
   defining region of interest (ROI) associated with a field of view (FOV) associated with the image capturing device.

4. The computer implemented method according to claim 3, wherein prior to step b), the method comprises:
   defining two or more ROIs for automated sequencing of vehicles in a side-by-side drive-thru configuration.

5. The computer implemented method according to claim 1, wherein prior to step c) candidate frames are identified from the acquired video using a background subtraction process including a Gaussian mixture model, eigenbackgrounds, principle component analysis or running average computation, the candidate frames including a detected vehicle within a predefined ROI.

6. The computer implemented method according to claim 1, wherein prior to step c) candidate frames are identified from the acquired video using a motion detection process with the ROI including a temporal difference process, a pixel-level optical flow process or a block-matching process, the candidate frames including a detected vehicle within a predefined ROI.

7. The computer implemented method according to claim 1, wherein the one or more deformable parts models are trained using positive video samples including a plurality of partially occluded vehicle models and a plurality of landmarks are assigned to the positive video samples which outline a non-occluded portion of the vehicle models.

8. An image processing system comprising:
   a memory and a processor operatively associated with the memory configured to receive a digital image of a scene and execute instructions to perform a method for updating an event sequence including tracking one or more partially occluded vehicles in a queue area captured with one or more image capturing devices, the method comprising:
   a) acquiring video of the queue area from the one or more image capturing devices, the video including a plurality of video frames;
   b) receiving a number of individual event requests from multiple subjects, each event request being received by a subject in a vehicle located in one of multiple queues in the queue area and at least one vehicle including an occluded portion and a non-occluded portion, the occluded portion occluded by another vehicle located in another queue at least near a predefined merge point associated with the queue area;
   c) processing one or more of the video frames and at least one region of interest (ROI) associated with the video frames to detect vehicles located near at least one defined start point, the process using one or more elastic deformation models to detect the non-occluded portion of the vehicle including the occluded portion, each start point corresponding to one of the multiple queues in the queue area;
   d) tracking a movement of each detected vehicle through the queue area over a subsequent series of frames using the elastic deformation model to track the non-occluded portion of the vehicle including the occluded portion;
   e) determining if a location of a tracked vehicle corresponds to the predefined merge point associated with the queue area where the multiple queues in the queue area converge into a single queue lane;

f) in response to the tracked vehicle reaching the predefined merge point, computing an observed sequence of where the tracked vehicle is sequentially positioned relative to other vehicles past the merge point and approaching an end-event point in the single queue lane; and g) updating a sequence of the events to match the observed sequence of vehicles in the single queue lane, wherein the queue area includes a fast-food-drive-thru, the event-requests include food orders, and the end-events include one of goods and services.

9. The image processing system according to claim 8, wherein prior to step d), the method comprises:
checking if the detected non-occluded portion of the vehicle is already being tracked.

10. The image processing system according to claim 8, wherein prior to step b), the method comprises:
defining region of interest (ROI) associated with a field of view (FOV) associated with the image capturing device.

11. The image processing system according to claim 10, wherein prior to step b), the method comprises:
defining two or more ROIs for automated sequencing of vehicles in a side-by-side drive-thru configuration.

12. The image processing system according to claim 8, wherein prior to step c) candidate frames are identified from the acquired video using a background subtraction process including a Gaussian mixture model, eigenbackgrounds, principle component analysis or running average computation, the candidate frames including a detected vehicle within a predefined ROI.

13. The image processing system according to claim 8, wherein prior to step c) candidate frames are identified from the acquired video using a motion detection process with the ROI including a temporal difference process, a pixel-level optical flow process or a block-matching process, the candidate frames including a detected vehicle within a predefined ROI.

14. The image processing system according to claim 8, wherein the one or more deformable parts models are trained using positive video samples including a plurality of partially occluded vehicle models and a plurality of landmarks are assigned to the positive video samples which outline a non-occluded portion of the vehicle models.

15. A system for updating an event sequence, the system comprising an automatic sequencing device including a memory and a processor in communication with the processor configured to:
acquire video data of a queue area from at least one image source, each image source associated with an image plane;
receive a number of individual event requests from multiple subjects, each event request being received when a subject in a vehicle is located in one of multiple queues in the queue area and at least one vehicle includes an occluded portion occluded by another vehicle located in another queue at least for a predefined merge point associated with the queue area;
process the video data using an elastic deformation model to detect the non-occluded portion of the vehicle including the occluded portion located near at least one of a plurality of start points, each start point corresponding to a location associated with one of the multiple queues in the video data;
track a movement of each detected vehicle through the queue area over a subsequent series of frames associated with the video data using the elastic deformation model to track the non-occluded portion of the vehicle including the occluded portion;
determine if a location of a tracked vehicle reaches the predefined merge point on the image plane where the multiple queues in the queue area converge into a single queue lane;
in response to the tracked vehicle reaching the predefined merge point, compute an observed sequence of where the tracked vehicle is sequentially located relative to other vehicles past the merge point and approaching an end-event point in the single queue lane; and,
update a sequence of the events to match the observed sequence of vehicles in the single queue lane,
wherein the queue area includes a fast-food-drive-thru, the event-requests include food orders, and the end-events include one of goods and services.

16. The system of updating an event sequence according to claim 15, wherein the memory and processor is further configured to:
define an ROI in the queue area.

17. The system of updating an event sequence according to claim 15, wherein the processor is further configured to:
compute a statistic of tracked feature locations of the vehicle;
compare the statistic to a location of a merge point region; and,
determine if a location of the tracked vehicle corresponds to the predefined merge point based on the comparison;
wherein the statistic is selected from a group consisting of: a single point identifying a position of the tracked subject, a centroid of the tracked feature locations, a median center location of the tracked feature locations, a first point, a predetermined percentage of feature points, a last point, and a degree of overlap.

18. The system of updating an event sequence according to claim 15, wherein the memory and processor is further configured to:
process the acquired video data to determine candidate vehicles;
classify each candidate vehicle as belonging to one of a new vehicle and a currently tracked vehicle;
in response to the candidate vehicle being a new vehicle, assign a tracker to the new vehicle; and
in response to the candidate subject being a currently tracked vehicle, discard the candidate vehicle.

19. The system for updating an event sequence according to claim 18, wherein the candidate vehicles are determined from candidate video frames which are identified using one of a background subtraction process and a motion detection process.

20. The system of updating an event sequence according to claim 18, wherein the memory and processor is further configured to:
extract a feature descriptor from each detected candidate vehicle;
compare the extracted feature descriptor to one of a threshold and corresponding descriptors of current trackers; and
based on the comparing, classify each detected candidate vehicle as belonging to one of a new vehicle and a currently tracked vehicle.

* * * * *